US011886944B1

(12) United States Patent
Morales

(10) Patent No.: US 11,886,944 B1
(45) Date of Patent: Jan. 30, 2024

(54) ENHANCED SPOT COLOR ADJUSTMENT SYSTEM AND METHODS FOR COLOR PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/139,032

(22) Filed: Apr. 25, 2023

Related U.S. Application Data

(63) Continuation-in-part of application No. 18/094,204, filed on Jan. 6, 2023.

(51) Int. Cl.
*H04N 1/60* (2006.01)
*G06K 15/02* (2006.01)
*H04N 1/00* (2006.01)

(52) U.S. Cl.
CPC ....... *G06K 15/027* (2013.01); *G06K 15/1878* (2013.01); *H04N 1/00023* (2013.01); *H04N 1/60* (2013.01)

(58) Field of Classification Search
CPC ............. G06K 15/027; G06K 15/1878; H04N 1/00023
See application file for complete search history.

(56) References Cited

U.S. PATENT DOCUMENTS

| 7,701,625 | B2* | 4/2010 | Woolfe | H04N 1/6055 |
| | | | | 358/518 |
| 8,049,926 | B2* | 11/2011 | Hayward | H04N 1/6033 |
| | | | | 358/1.9 |
| 8,681,375 | B2* | 3/2014 | Katayama | H04N 1/6055 |
| | | | | 358/1.9 |
| 2008/0079964 | A1* | 4/2008 | Woolfe | H04N 1/6055 |
| | | | | 358/1.9 |

(Continued)

FOREIGN PATENT DOCUMENTS

JP 3453003 B2 * 10/2003 ........... H04N 1/6033

OTHER PUBLICATIONS

Image Press C10000VP Series 6.1 (May 2018) pp. 1-3.

*Primary Examiner* — Ted W Barnes
(74) *Attorney, Agent, or Firm* — Millen, White, Zelano & Branigan P.C.; William F. Nixon

(57) ABSTRACT

A spot color adjustment system allows an operator to adjust spot colors through the use of test charts printed at a printing device. A target color swatch is determined from a first spot color. A test chart is generated based on the target color swatch that includes a plurality of rings of color swatches centered on the target color swatch. Each ring of color swatches is positioned around the target color swatch at an adjustment value. The adjustment value for each ring of color swatches corresponds to a color change from the target color swatch. The system allows for determining a number of rings of color swatches depending on a selected paper size. The outer rings of a large number of rings of color (Continued)

include intermediary color swatches. A midpoint color is determined from a plurality of selected color swatches. The system provides color swatches showing gray component replacement.

20 Claims, 13 Drawing Sheets

(56) References Cited

U.S. PATENT DOCUMENTS

| | | | |
|---|---|---|---|
| 2010/0085587 A1* | 4/2010 | Hayward | H04N 1/6033 358/1.9 |
| 2012/0050770 A1* | 3/2012 | Katayama | H04N 1/6033 358/1.9 |
| 2012/0075645 A1* | 3/2012 | Katayama | H04N 1/6055 358/1.9 |
| 2012/0081722 A1* | 4/2012 | Katayama | G06K 15/1878 358/1.9 |
| 2014/0198328 A1* | 7/2014 | Katayama | G06K 15/027 358/1.9 |
| 2017/0060504 A1* | 3/2017 | Nakayama | G06F 3/1285 |

* cited by examiner

ENHANCED SPOT COLOR ADJUSTMENT SYSTEM AND METHODS FOR COLOR PRINTING OPERATIONS

FIELD OF THE INVENTION

The present invention relates to a printing system and associated methods to adjust spot colors for color printing operations. More particularly, the present invention relates to an enhanced spot color adjustment system to reduce the number of iterations needed to adjust a spot color.

DESCRIPTION OF THE RELATED ART

Spot colors are used by brands to ensure a consistent appearance for their logos and other brand identification content. These colors are often from a licensed library that defines spot colors using a device-independent color space, such as the L*a*b color space. When files are submitted to a printing device using one of these spot colors, the printing device converts the spot color from the L*a*b color space to the paper color space. While this conversion is expected to produce the best possible color reproduction for the specific spot color, the appearance may be unacceptable to customer in the print shop.

For this reason, modern digital front end (DFE) controllers on printing devices provide functionality to adjust spot color appearance. DFEs also may store this appearance in an alternate color book. The standard way to perform spot color adjustment is to allow the operator to print a chart with variations of the spot color. The variations usually are shown as hue, saturation, and lightness (HSL) adjustments. The operator may print a chart with the spot color at the center of a cluster of color swatches. More than one cluster may be printed. The color swatches around the center adjustment represent a hue adjustment from the center. The clusters represent either a lightness or saturation adjustment.

The operator may print the chart and selects one of the swatches, which is then placed in the center of subsequent clusters of color swatches that may be printed at the printing device. The operator repeats this process until he/she finds a swatch with the desired appearance. As the operator gets closer to the desired appearance, he/she may change the size of the adjustment in order to fine tune the color appearance. This process, while workable, may take significant time as the operator must print a test chart for every step in the adjustment.

SUMMARY OF THE INVENTION

A method for adjusting spot colors in printing operations is disclosed. The method includes determining a first color swatch of a first spot color. The method also includes generating a test chart having a plurality of rings of color swatches by positioning each ring of color swatches from the plurality of rings around the first color swatch at an adjustment value. The adjustment value for each ring of color swatches corresponds to a color change from the first color swatch. A number of color swatches in each ring increases extending away from the first color swatch. The adjustment value for a first ring of color swatches is less than the adjustment value for a second ring of color swatches. The method also includes selecting a second color swatch having a second spot color from one of the plurality of rings encompassing the first color swatch. The method also includes adjusting the test chart to center the second color swatch. The method also includes generating a new test chart having a new plurality of rings around the second color swatch.

A method for adjusting spot colors in printing operations. The method includes determining a first color swatch of a first spot color. The method also includes generating a first test chart having a plurality of rings swatches by positioning each ring of color swatches from the plurality of rings around the first color swatch at an adjustment value. The adjustment value for each ring of color swatches corresponds to a color change from the initial color swatch. A number of color swatches in each ring increases extending away from the initial color swatch. The adjustment value for a first ring of color swatches is less than the adjustment value for a second ring of color swatches. The method also includes generating a second test chart having a second color swatch of a second spot color. The second spot color differs in lightness or saturation from the first color spot. The method also includes selecting a subsequent color swatch from the second test chart. The method also includes adjusting the test chart to center the subsequent color swatch. The method also includes generating a new test chart having a new plurality of rings around the subsequent color swatch.

A method for adjusting spot colors in printing operations is disclosed. The method includes determining a first color swatch of a first spot color. The method also includes generating a first test chart having a plurality of rings of color swatches by positioning each ring of color swatches from the plurality of rings around the first color swatch at an adjustment value. The adjustment value for each ring of color swatches corresponds to a color change from the initial color swatch. A number of color swatches in each ring increases extending away from the initial color swatch. The adjustment value for a first ring of color swatches is less than the adjust value for the second rings of color swatches. The method also includes selecting a subsequent color swatch having a second spot color from one of the plurality of rings encompassing the initial color swatch. The method also includes generating a new test chart having a new plurality of rings around the subsequent color swatch based on an adjustment value for the subsequent color swatch.

A method for printing a test chart for adjusting spot colors in printing operations is disclosed. The method includes determining a first color swatch of a first spot color. The method also includes specifying a size for a sheet for the test chart. The method also includes determining a number for a plurality of rings of color swatches for the test chart centered around the first color swatch based on the size of the sheet. The method also includes generating the test chart having the number of the plurality of rings by positioning each ring of color swatches of the plurality of rings around the first color at an adjustment value. The adjustment value for each ring of color swatches corresponds to a color change from the first color swatch. The adjustment value for a first ring of color swatches of the plurality of color swatches is less than the adjustment value for a second ring of color swatches. The method also includes printing the test chart having the number of the plurality of rings within the size for the sheet.

A method for adjusting spot colors in printing operations is disclosed. The method includes determining a first color swatch of a first spot color as a center color swatch. The method also includes generating a first plurality of test charts. Each chart has a plurality of rings of color swatches by positioning a first plurality of rings of color swatches for a first test chart centered around the first color swatch at a color adjustment value. The adjustment value for each of the first plurality of rings corresponds to a first color change from the first color swatch. The generating step also includes positioning a second plurality of rings of color swatches for a second test chart centered around a second color swatch at the color adjustment value. The second color swatch differs from the first color swatch according to an increase in a lightness adjustment value. The generating step also includes positioning a third plurality of rings of color swatches for a third test chart centered around a third color swatch at the color adjustment value. The third color swatch differs from the first color swatch according to a decrease in the lightness adjustment value. The method also includes selecting a desired color swatch having a desired spot color from one of the first plurality of rings, the second plurality of rings, and the third plurality of rings.

A method for adjusting spot colors in printing operations is disclosed. The method includes determining a first color swatch of a first spot color. The method also includes generating a test chart having a plurality of rings of color swatches by positioning each ring of color swatches from the plurality of rings around the first color swatch at an adjustment value. The adjustment value for each ring of color swatches corresponds to a color change from the first color swatch. A number of color swatches in each ring increases extending away from the first color swatch. The adjustment value for a first ring of color swatches is less than the adjustment value for a second ring of color swatches. The method also includes selecting a set of color swatches from the plurality of rings. The set of color swatches having different spot colors from the first spot color. The method also includes determining a first midpoint color in a color space based on the set of color swatches. The method also includes adjusting the first new test chart to center the first midpoint color. The method also includes generating the first new test chart having a new plurality of rings around the first midpoint color.

A method for adjusting spot colors in printing operations is disclosed. The method includes generating a test chart having a plurality of rings centered on a first color swatch having a first spot color. The method also includes selecting a second color swatch having a second spot color from one of the plurality of rings on the test chart. The method also includes modifying a color composition for the second spot color of the second color swatch using a gray component replacement (GCR) process, wherein a primary color of the color composition is replaced with a gray component. The method also includes generating a plurality of test color swatches having different GCR levels. One level of the different GCR levels includes a maximum GCR level. The method also includes generating a test chart of the plurality of test color swatches having different GCR levels.

A method for generating a test chart for spot color adjustment during printing operations is disclosed. The method includes selecting a color swatch having a spot color. The method also includes modifying a first primary color component for the spot color using different levels of gray component replacement (GCR). The method also includes generating a first set of test color swatches. Each level of GCR includes at least one test color swatch. The method also includes determining the first primary color component is below a minimum colorant setting for a level of GCR of the different levels. The method also includes setting the first primary color component to 0% for the corresponding level of GCR. The method also includes adding a minimum colorant test swatch to the at least one test color swatch for the corresponding level of GCR. The method also includes printing a test chart including the first set of test color swatches and the minimum colorant test color swatch.

A method for generating a test chart for spot color adjustment during printing operations is disclosed. The method includes selecting a color swatch having a spot color. The method also includes modifying a first primary color component for the spot color using different levels of gray component replacement (GCR). The method also includes generating a first set of test color swatches. Each level of GCR includes at least one test color swatch. The method also includes determining the first primary color component is above a maximum colorant setting for a level of GCR of the different levels. The method also includes setting the first primary color component to 100% for the corresponding level of GCR. The method also includes adding a maximum colorant test color swatch to the at least one test color swatch for the corresponding level of GCR. The method also includes printing a test chart including the first set of test color swatches and the maximum colorant test color swatch.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
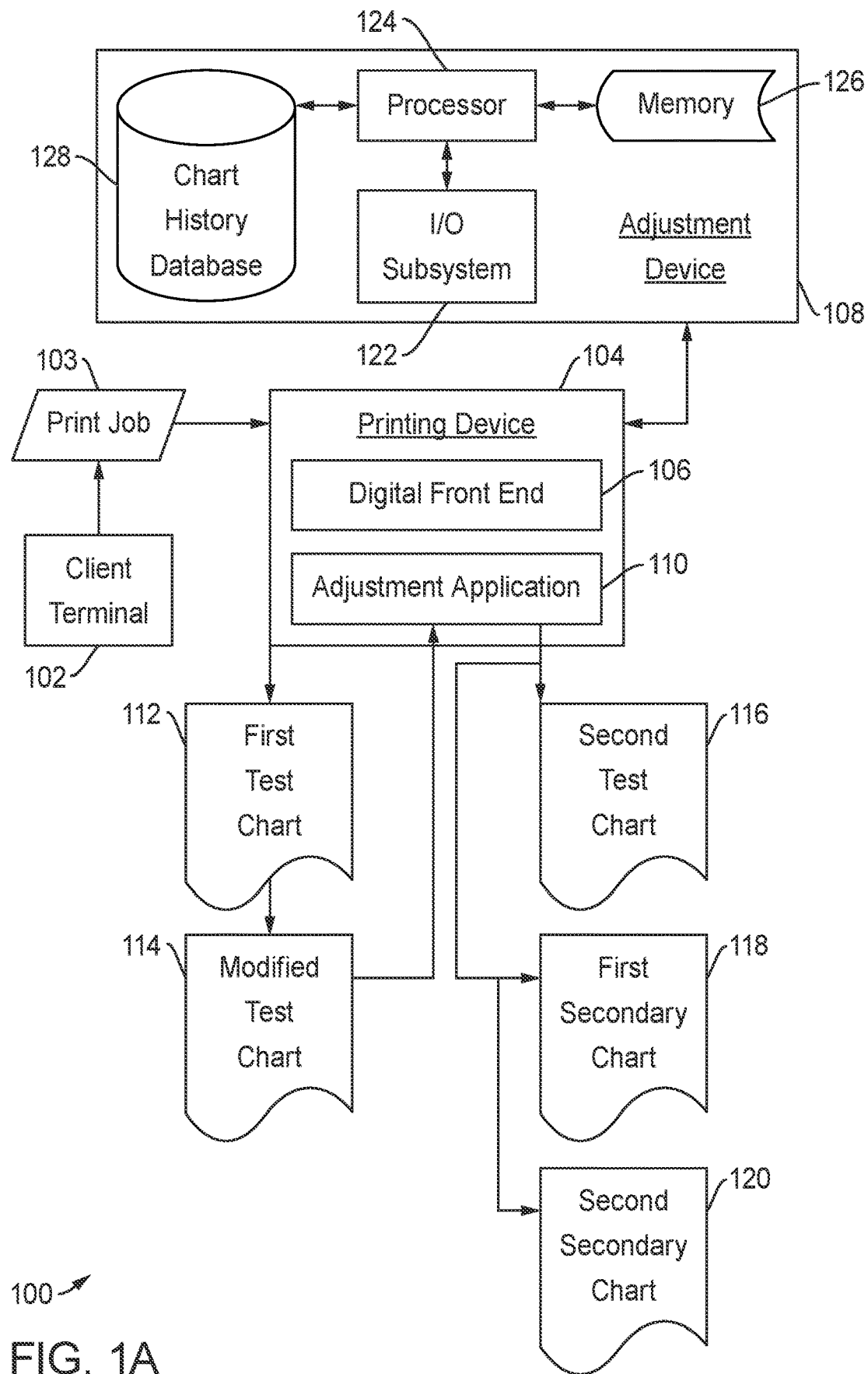
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide an enhanced spot color adjustment system and methods that significantly reduce the number of iterations taken to adjust a spot color. The system retains the basic spot color adjustment process. The operator selects the spot color, generates a test chart with variations, allows the operator to select a swatch from the variations and iterate. The disclosed embodiments, however, generate multiple charts per the methods instead of printing a single test chart with 21 patches and a single adjustment step per cluster.

Rather than printing a single set of adjustments around the selected color, the disclosed embodiments print a much larger set of variations with some properties to improve spot color adjustment. The system would generate an enhanced target with 91 patches as opposed to printing a single set of variations around the selected swatch. This target provides several features versus known spot color adjustment targets. The target, or test chart, would have five (5) adjustment steps, or rings in the target as opposed to a single step hue adjustment for the selected color, the first ring thereof is shown as the six (6) color swatches in the ring around the center swatch. The test chart also would adjust along an intermediary axis after the first adjustment step, or the first ring as opposed to adjusting along the primary (CMY) and secondary (RGB) print color axes. Additional rings would perform further intermediary adjustments.

This feature not only provides a greater range of adjustments in one iteration but it also helps operators find the desired color appearance in fewer iterations because the adjustments in the target cover more of the color space around the target color. Even if the operator does not find the color with the adjustments, this feature decreases the number of iterations because the operator can get closer to the likely position of the desired color with a single adjustment. Intermediary color adjustments are repeated on more than one axis for the colors that are closer to the original color, such as rings 2 and 3.

The adjustments incorporate graduated adjustment steps in which the color change is greater in each adjustment ring. For example, the innermost ring may have a very small adjustment, such as 3dE, when compared to the outermost ring that may have a larger adjustment, such as 6dE. This feature reduces the number of print and measure iterations for the operator because, as the operator gets closer to the desired appearance, the granularity of the adjustment is decreased. In addition, by having larger adjustments for colors that are in the outer ring, the test chart allows the operator to more rapidly approach the desired appearance.

The target could have additional patches in the outer rows as the swatch size gets smaller for outer rings, which represent more coarse adjustments. This feature would cover additional areas of the color space around the target that may help further reduce iterations to adjust to the desired spot color. Moreover, the patches get larger as the operator gets closer to the center, or the target appearance. The graduated patch sizes may server two functions. First, as they get smaller in the outer rings, the patch sizes help better cover the color space further away from the target. Secondly, as they get larger towards the inner rings, the patch sizes help the operator more accurately match color because smaller patches can lead to less accurate observation of the color.

The above disclosed adjustment would still represent a horizontal ring within the L*a*b color space. In order to cover additional adjustments, the disclosed system could print multiple test charts that perform the same adjustments but with changes to the lightness or saturation of the center color. The variations would then be based on the adjusted center color. This feature would reduce the number of iterations needed to reach the desired color appearance.

Once the operator makes a selection, the disclosed system would center on the selected color swatch and offer the operator the option to print another test chart. Unlike existing systems in which the adjustment size is based on a setting that the operator selects, the disclosed system would dynamically determine the adjustment size for each chart iteration. This feature would be based on the distance between the initial and selected color space. For example, if the distance to the selected color is 5dE, then the target color would be adjusted so that the ring covered a color space that is based on this distance. This could be covering the entire 5dE from the new color. Alternatively, the disclosed system could cover a percentage of the above color space, such as 80% of the dE between the initial color and the selected color.

Optionally, this distance would consider not just the hue adjustment but also the lightness adjustment so the place created by the test chart would be angled between the initial and the selected spot colors. The dynamic step size selection would minimize the number of iterations as the disclosed system would increase granularity as the operator got closer to the desired appearance. This feature may reduce the number of iterations needed to find the current appearance.

The disclosed system also may keep a history of the printed charts. The operator would have the ability to see this history and jump back to any given point in the process. For cases in which the operator made a mistake and ended up further from the desired appearance, this feature would allow the operator to roll back to a known "good" step.

The disclosed embodiments enable additional enhancements to reduce the time and effort required to adjust a spot color's appearance. Further, the disclosed embodiments provide additional enhancements to improve the reproducibility of the selected spot color. The disclosed embodiments enable printing of multiple targets that would vary the lightness of the swatches without changing the swatch hue. The disclosed embodiments also increase the lightness change for swatches in the outer rings. In addition, the disclosed embodiments not just print additional charts but allow the operator to specify additional options for the printing of these charts.

For example, chart composition enhancements allow the operator to specify different paper sizes, such as smaller or larger. The printing system would compose a chart with fewer or additional rings based on whether the selected paper size is smaller or larger as compared to the paper size typically used to print these charts. Charts typically may be letter or A4 size paper. An A5 chart, for example, may include only 3 rings whereas an A3 chart may include 7 or even 8 rings. The operator may select the chart size for each iteration so that, for example, the first chart may be on an A3 sheet in order to cover a broader range of colors. The second chart may be on an A5 sheet if the operator finds a swatch in the A3 chart that is very close to the desired color.

In some embodiments, the larger charts may change the composition of the colors in the swatches by using the intermediary swatches in the outer rings to shift lightness up and down. This feature would eliminate the need to print multiple charts that have a different lightness adjustment because the lightness adjustments may be implemented in the intermediary patches in the outer rings.

Additionally, when printing 3 or more charts, the printing system may vary the lightness adjustments between charts so that the charts closest to the center chart have a smaller lightness adjustment as opposed to the outer charts. For example, if 5 charts are printed, then the charts may adjust lightness values as follows:

Chart 1—+10 (in addition to the +7 and +4 in chart 2)
Chart 2—+7 (in addition to the +4 in chart 3)
Chart 3—+4
Chart 4—no adjustment
Chart 5—−4
Chart 6—−7 (in addition to −4 in chart 5)
Chart 7—−10 (in addition to −7 and −4 in chart 6)

Essentially, the incrementing distance applied to rings that are further from the center also is applied to additional charts beyond the center chart.

The disclosed embodiment also provide swatch selection enhancements. Instead of asking the operator to enter the number, or other identification, for the swatch that is closest to the desired color, the printing system may allow the operator to enter multiple swatch numbers, or swatches. The operator may enter as many swatch numbers as desired. The printing system will use one or more methods to find the midpoint for the entered swatches. This feature may reduce the number of iterations as the operator can specify the swatches that are closest to the desired spot color.

The disclosed embodiments also provide swatch composition adjustments. Once the operator selects a swatch, the printing system may give the operator the option to change the swatch composition in order to improve reproducibility. Printed colors are more stable if they user fewer colorants or if they used less cyan, magenta, and yellow (CMY) ink. This feature may be achieved through gray component replacement (GCR).

In addition, the disclosed embodiments will include two settings for swatch composition. A minimum colorant setting may default to 5%. A maximum colorant setting may default to 95%. In addition to generating several variations of the spot color swatches with different GCR levels, the printing system will then look at the cyan, magenta, yellow, and black (CMYK) values for all of the colors. If either the original swatch or any of the variants has a colorant whose value is below or above the minimum colorant or maximum colorant thresholds, then the printing system will show additional variations of that swatch.

For swatches that have colorants below the minimum colorant threshold, the printing system will show a swatch variation in which that colorant is set to 0%. For swatches that have colorants above the maximum colorant threshold, the printing system will show a swatch variation in which that colorant is set to 100%. The above variations may be shown in addition to the original swatches, as disclosed below.

For the GCR swatch charts, the minimum colorant swatch shows the colors that are less than 5% from cyan, magenta, yellow, or black (CMYK) and which have been changed to 0%. In this example, the original color has a colorant with less than 5% so there is a swatch from the minimum colorant row. As GCR is applied, that colorant may be set to 0%, which is why there may not be any minimum colorants for medium and high GCR entries. As GCR is applied more aggressively, however, other colorants are reduced so a different colorant is not below 5%, which is why the swatch may reappear for the maximum GCR column.

For the GCR swatch charts, the maximum colorant swatch show the colors that are than 95% for CMYK and which have been changed to 100%. In this example, the original color has a colorant with more than 95% so there is a swatch in the maximum colorant row. As GCR is applied, that colorant may be lowered to less than 95%, which is why there are no maximum colorant swatches for low, medium, and high GCR. As GCR is applied more aggressively, however, the black, or K, colorant is increased until it is above 95%, which is why the swatch reappears from the maximum GCR column. A minimum and maximum colorant swatch shows the colors that are both less than 5% for one colorant of CMYK and more than 95% for another colorant, so that an extra swatch may be shown.

If the operator decides to improve the reproducibility of the spot color, the printing system will print another chart. This chart, however, will be different than the usual chart. This chart will show a line of color swatches for the same color but with different GCR levels. The operator may select one of these swatches by entering a swatch number. According to the disclosed embodiments, the colors may be moved around to more reproducible spot colors.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client terminals 102.

Printing device 104 receives print jobs through printing system 100, such as print job 103. After processing print job 103, printing device 104 prints or produces a document in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B. In addition to the components of DFE 106 disclosed in FIG. 1B, it also includes various settings that may be of use for printing operations Printing system 100 also may be a spot color adjustment system. Printing device 104 may be used in spot color adjustment operations. Printing device 104 may include a spot color adjustment application 110 to facilitate the functionality to adjust spot colors. When an operator desires to adjust a spot color, the operator selects an initial spot color. Adjustment application 110 may generate a print job 103 for a page including the initial spot color as an initial color swatch along with rings of color swatches. These color swatches are printed as first test chart 112. An example of a test chart and color swatches may be seen in FIG. 4. The operator may review first test chart 112 and select a subsequent color swatch to adjust the spot color from one of the outer color swatches. Thus, the operator generates modified test chart 114.

The operator takes modified test chart 114 and feeds the selected color swatch back to adjustment application 110. The operator may indicate on a screen at printing device 104 which color swatch is selected by using a number or other identification. Alternatively, the operator may scan modified test chart 114 so that printing device 104 captures the selection and provides it to adjustment application 110. Adjustment application 110 then generates a new test chart with the selected color swatch acting as the target, or center, color swatch with the accompanying rings of color swatches around it. Printing device 104 may print the new test chart as second test chart 116.

In some embodiments, second test chart 116 may be accompanied by first secondary chart 118 and second secondary chart 120. The secondary charts show the changes in the lightness from the target color swatch selected using modified test chart 114. This feature is disclosed in greater detail below. In short, first secondary chart 118 may include color swatches that form a "bowl" shape of rings around the target color swatch as the lightness changes to lighter colors based on the target color swatch. Second secondary chart 120 also includes color swatches that form a "bowl" shape of rings around the target color swatch but in the opposite direction as the lightness changes to darker colors based on the target color swatch.

The operator may then select another color swatch from second test chart 116, or, if applicable, from first secondary chart 118 or second secondary chart 120. The selected color swatch is provided back to adjustment application 110 and the process repeated until the desired spot color is found.

These functions do not necessarily need to be performed at printing device 104. System 100 also may include adjustment device 108. Adjustment device 108 may be connected to printing device 104 so as to send and receive data regarding spot color adjustment. Adjustment device 108 may generate the test charts to be printed and receive selected color swatch information from printing device 104. It also may receive the selected color swatch information, such as a swatch number, from the operator after a test chart is reviewed. Adjustment device 108 may communicate with adjustment application 110 to implement spot color adjustment processes according to the disclosed embodiments. In some embodiments, adjustment device 108 may be client terminal 102.

Adjustment device 108 also may be connected to other printing devices within system 100. In some embodiments, adjustment device 108 may be a server. Adjustment device 108 includes a memory 126 and a processor 124. Adjustment device 108 also includes an input/output (I/O) subsystem 122 and a chart history database 128. Chart history database 128 may store generated test charts that are printed for spot color adjustment operations.

Processor 124 is in communication with memory 126. Processor 124 is configured to execute instruction code in memory 126. The instruction code controls adjustment device 108 to perform various operations for adjusting spot colors. Processor 124 may be a computer processing unit that executes the instruction code in memory 126.

I/O subsystem 122 may include one or more input, output, or input/output interfaces that are configured to facilitate communications with other devices within system 100, such as client terminal 102 and printing device 104. An example of I/O subsystem 122 may be configured to dynamically determine the communication methodology utilized by entities of system 100 to communication information thereto. For example, I/O subsystem 122 may determine that a first entity utilizes a RESTful API and can, as a result, communicate with the entity using an interface that uses a RESTful communication methodology.

Figure 1B:
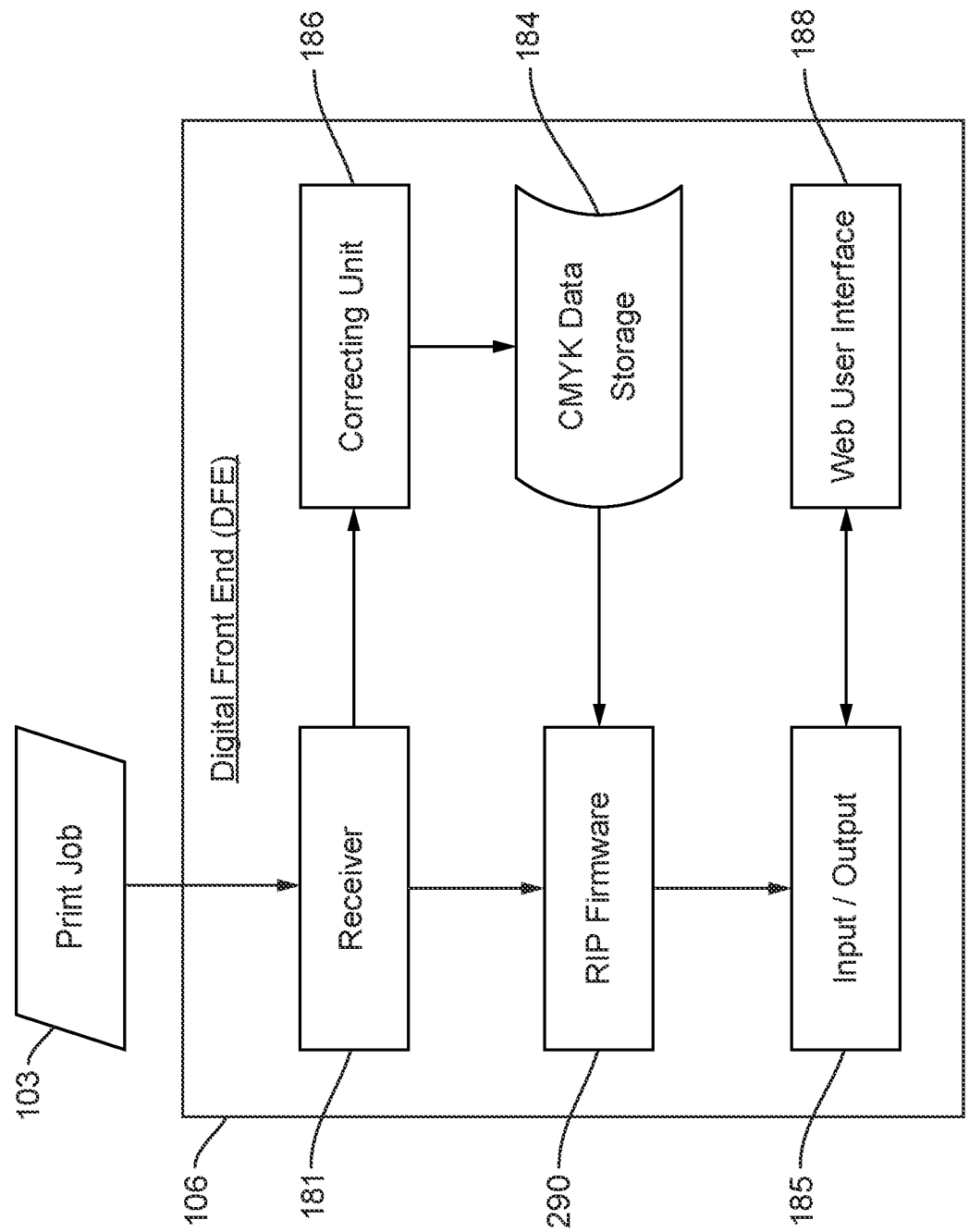
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for job settings, DFE configuration settings, and, optionally, printing device configuration settings, even though these are not shown in FIG. 1B.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or adjustment device 108, if it is located at a separate device, using, for example, input/output connector 185. Web user interface 188, or web application, allows a user of the DFEs of other printing devices to interact with content or software running on DFE 106.

Figure 2:
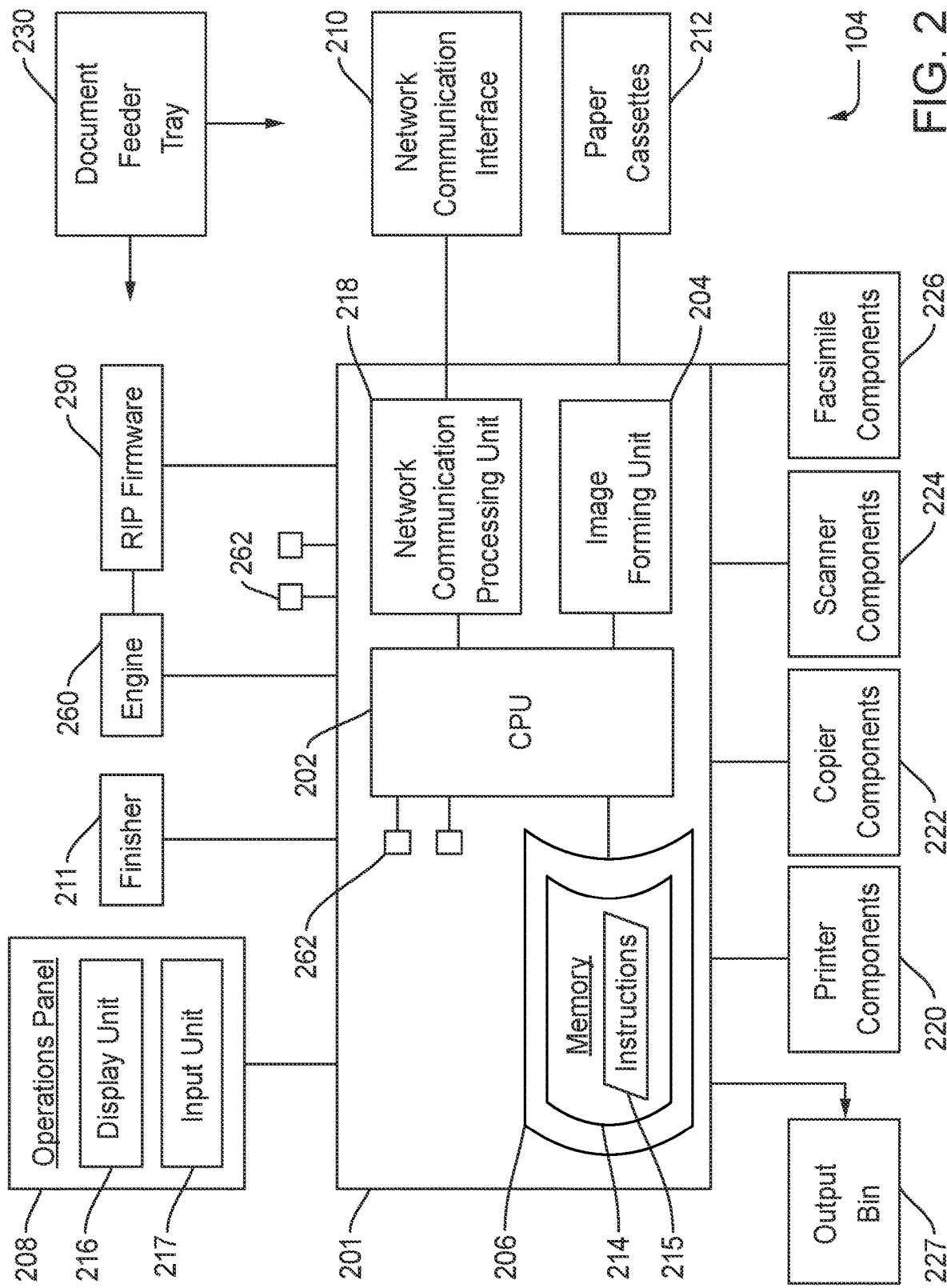
FIG. 2 illustrates a block diagram of components of the printing device for use within the printing system according to the disclosed embodiments.
Figure 3:
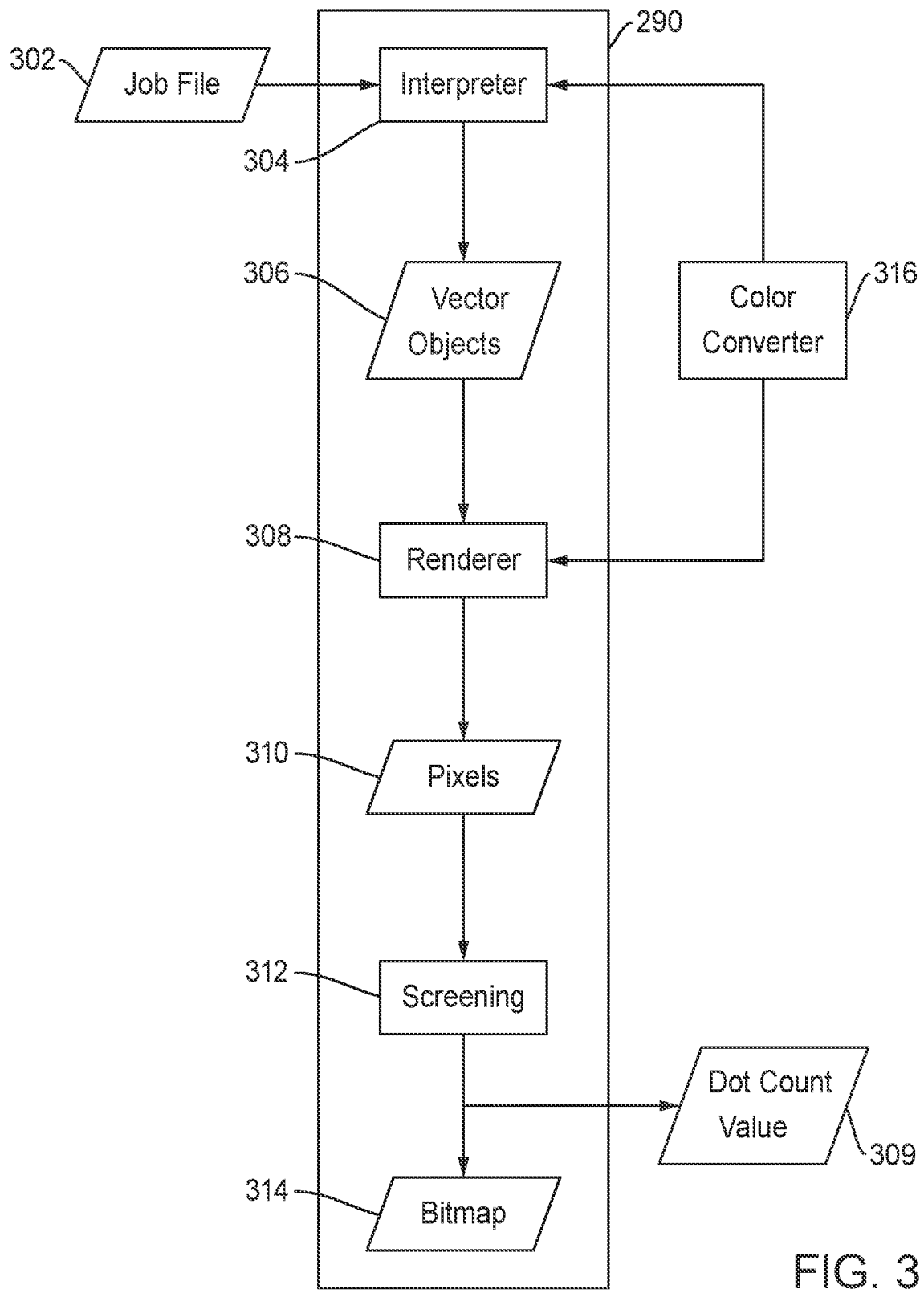
FIG. 3 illustrates a block diagram of RIP firmware used within the DFE according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from adjustment device 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from adjustment device 108, if applicable. It may include a digital representation of first test chart 112 that the operator may select a desired spot color adjustment that is then provided to adjustment application 110 or adjustment device 108 to generate second test chart 116. The operator also may recall previous charts or data related to the spot color adjustment operations for review.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from adjustment device 108 as well as other printing devices within system 100.

Figure 4:
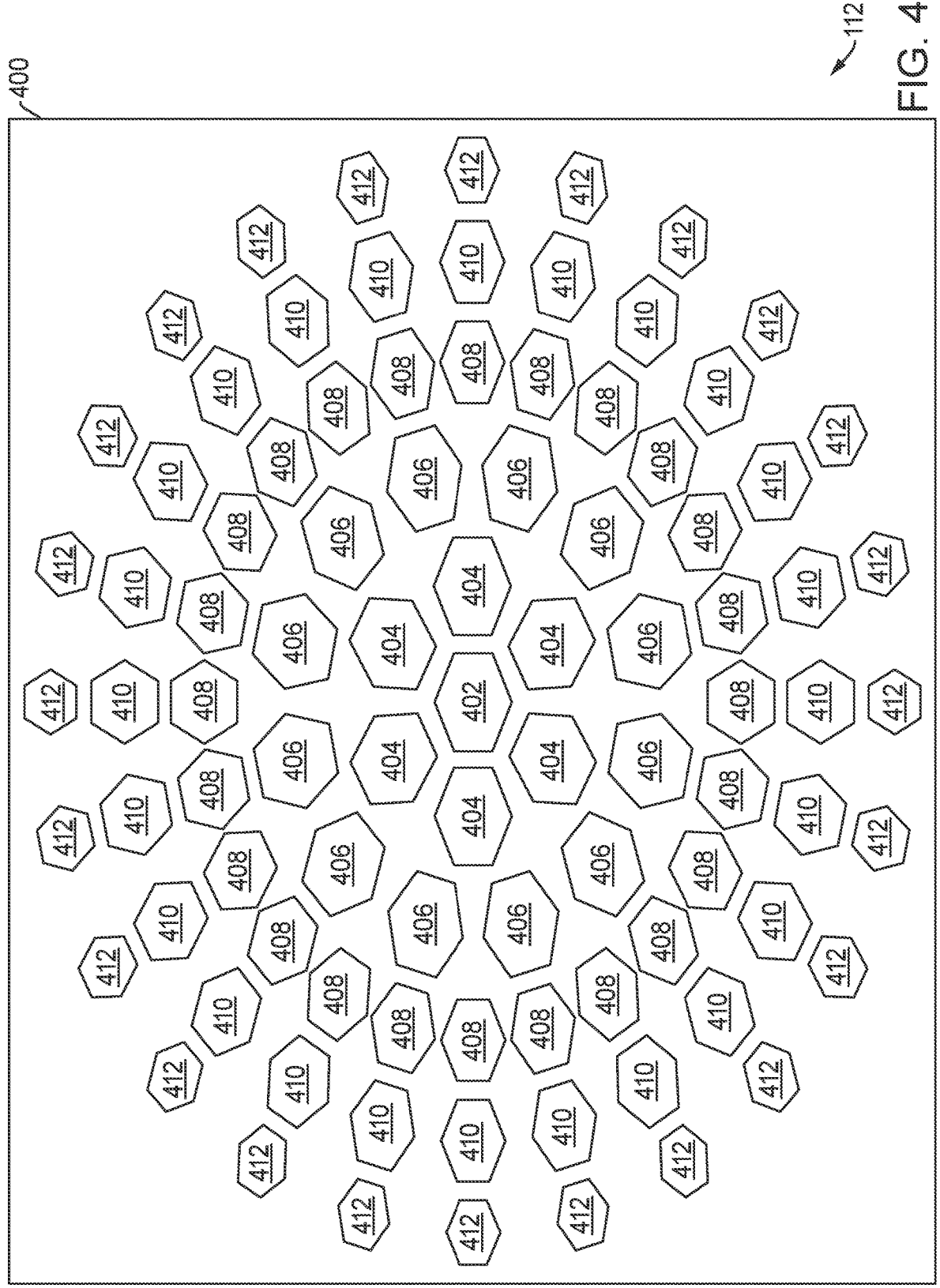
FIG. 4 illustrates a test chart for adjusting spot colors according to the disclosed embodiments.

FIG. 4 depicts first test chart 112 for spot color adjustment operations according to the disclosed embodiments. First test chart 112 may include a cluster, or number of color swatches, 400 based on a target, or initial, color swatch 402. Target color swatch 402 may include a determined or selected spot color of interest. First test chart 112 is printed by printing device 104. Adjustment application 110 may generate first test chart 112 based on the spot color corresponding to target color swatch 402. Alternatively, adjustment device 108 may generate first test chart 112 and forward it to printing device 104 as print job 103.

Color swatches 400 includes rings of color swatches that surround target color swatch 402. As opposed to conventional test charts that have one ring of color swatches, first test chart 112 includes five rings of color swatches. Each ring is an adjustment step away from the spot color of target color swatch 402. A first ring includes color swatches 404. A second ring includes color swatches 406. A third ring includes color swatches 408. A fourth ring includes color swatches 410. A fifth ring includes color swatches 412.

The first ring of color swatches 404 may adjust along the primary (CMY) and secondary (RGB) color axes, or a hue adjustment, much like the ring of color swatches in a conventional test chart. This feature may be known as the first adjustment step. The second ring of color swatches 406 would adjust along the intermediary axis for an intermediary adjustment from the spot color of target color swatch 402. Outer rings would provide further intermediary adjustments. This feature provides a greater range of adjustments within first test chart 112 to be available for a first iteration of spot color adjustment. It also allows the operator to find a desired spot color in fewer iterations because the rings cover more color space around target color swatch 402. Even if the operator does not find the desired spot color in the cluster of color swatches 400, first test chart 112 decreases the number of iterations because the operator can get closer to the desired spot color with a single adjustment.

First test chart 112 also incorporates graduated adjustment steps in which color change is greater for each ring of color swatches. For example, the first ring of color swatches 404 may have a very small adjustment, such as 3dE, as opposed to the fifth ring of color swatches 412. The fifth ring of color swatches may have a color adjustment of 6dE. In other words, the outermost ring of color swatches has a greater adjustment from the previous ring than the innermost ring from target color swatch 402, which may be understood as an exponential increase versus a linear one. This feature also reduces the number of print and measure iterations for the operator because the operator gets closer to the desired spot color as the granularity of the adjustment is decreased. In addition, by having larger adjustments for color swatches in the outer rings, first test chart 112 allows the operator to more rapidly approach the desired spot color.

It also should be noted that color swatches 412 in the fifth ring are smaller in size than color swatches 404 in the first ring. As rings move away from target color swatch 402, the color swatches in the corresponding rings are smaller. The swatch sizes get smaller for outer rings, which represent more coarse adjustments. This feature also covers additional areas of the color space around target color swatch 402 that may help further iterations. This difference in color swatch size may provide certain improvements in providing information to the operator. First, the smaller color swatches in the outer rings, such as color swatches 410 and 412, help better cover the color space further away from target color swatch 402. Second, the larger color swatches in the inner rings, such as color swatches 404 and 406, help the operator more accurately match color because the smaller patches can lead to less accurate observation of the colors.

Referring back to FIG. 1A, the operator may select a color swatch from first test chart 112 to generate modified test chart 114. The selected color swatch will become target color swatch 402 for second test chart 116. For example, if a color swatch 410 of the fourth ring is selected, then that color swatch will become target color swatch 402. Unlike conventional spot color adjustment operations in which the adjustment size for second test chart 116 is based on a setting by the operator, the disclosed embodiments dynamically may determine the adjustment size for the next test chart iteration.

The adjustment size preferably is based on the distance between the initial, or target, color swatch and the selected color swatch. Using the above example, if the distance for the selected color swatch within the fourth ring of color swatches 410 is 5dE, then target color swatch 402 for second test chart 116 would be adjusted so that the ring covered a space that is based on this distance. Target color swatch 402 of first test chart 112 may be in the fourth ring from the selected color swatch in second test chart 116. Alternatively, the disclosed embodiments may implement a percentage of the above color space, such as 80% of the dE between the initial color swatch and the selected color swatch.

As can be appreciated, the use of first test chart 112 and second test chart 116 reduces the number of iterations needed to adjust a spot color. Further, the operator does not need to input adjustment sizes as the adjustments are done automatically.

In preferred embodiments, the first ring of color swatches 404 may have a first swatch size. The second ring of color swatches 406 may have a second swatch size that is less than the first swatch size for the first ring of color swatches 404. Alternatively, the second ring of color swatches 406 may have a second swatch size that is greater than the first swatch size for the first ring of color swatches 404. In some embodiments, the swatches sizes within the rings of color swatches may be the same. The distance between the rings of color swatches also may vary or be the same, depending on the requirements of the operator or the system.

Figure 5:
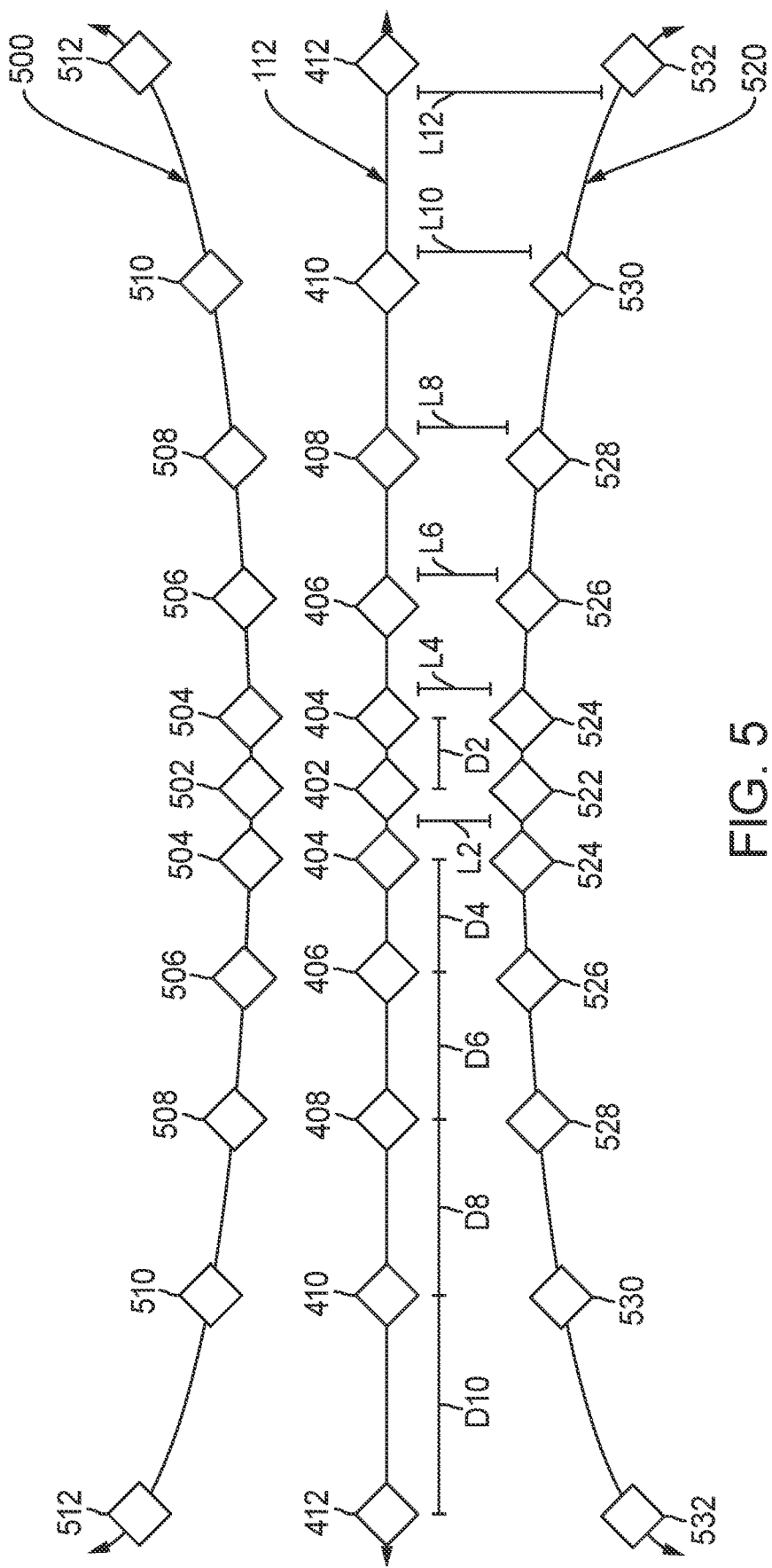
FIG. 5 illustrates the first test chart with secondary charts having adjustments according to lightness according to the disclosed embodiments.

FIG. 5 depicts first test chart 112 with secondary charts 500 and 520 having adjustments according to lightness according to the disclosed embodiments. The embodiments disclosed by FIG. 4 represent a horizontal ring within the hue, saturation, and lightness (HSL) color space. In order to cover additional adjustments, the disclosed embodiments may provide multiple test charts that perform the same adjustments but with changes to the lightness or saturation of the spot color of target color swatch 402. Thus, FIG. 5 shows first test chart 112 with target color swatch 402. Secondary test charts 500 and 520 also are shown. The variations shown in the secondary test charts are based on the adjusted center color swatch in the respective secondary test chart.

First test chart 112 includes target color swatch 402, the first ring of color swatches 404, the second ring of color swatches 406, the third ring of color swatches 408, the fourth ring of color swatches 410, and the fifth ring of color swatches 412. It also may be shown that the distances, or adjustment, between target color swatch 402 and the various rings varies as the rings extend farther from the target color swatch. For example, the amount of adjustment between target color swatch and the first ring of color swatches 404 is D2. Amount of adjustment D2 may be the smallest amount of adjustment between color swatches on first test chart 112.

The amount of adjustment between the first ring of color swatches 404 and the second ring of color swatches 406 is D4, which is larger than D2. Thus, as first test chart 112 moves to color swatches 406, the amount of adjustment increases, not only from target color swatch 402 to color swatches 406 but from amount of adjustment D2 to amount of adjustment D4. The amount of adjustment between the second ring of color swatches 406 and the third ring of color swatches 408 is D6, which is larger than D4. The amount of adjustment between the third ring of color swatches 408 and the fourth ring of color swatches 410 is D8, which is larger than D6. The amount of adjustment between the fourth ring of color swatches 410 and the fifth ring of color swatches 412, is D10, which is larger than D8. Within the amounts of adjustment between rings of color swatches, the largest amount of variation is shown by D10 between the fourth and fifth rings.

With regard to the secondary test charts, these vary according to lightness or saturation. For example, secondary test chart 500 may include a center color swatch 502 that is lighter than target color swatch 402. Secondary test chart 520 may include a center color swatch 522 that is darker than target color swatch 402. The rings of color swatches on secondary test charts 500 and 520 also vary based on center color swatches 502 and 522, respectively. The distance, or amount of adjustment, however, from target color swatch 402 also varies so that an amount of adjustment from the target color swatch to the fifth ring of color swatches on a secondary test chart is greater than the amount of adjustment from the target color swatch to the center color swatch on the secondary test chart.

Secondary test chart 500 includes center color swatch 502. It also includes the first ring of color swatches 504, similar to the first ring of color swatches 404 of first test chart 112. Secondary test chart 500 also includes the second ring of color swatches 506, the third ring of color swatches 508, the fourth ring of color swatches 510, and the fifth ring of color swatches 512. The distances between the rings of secondary test chart 500 increase as they extend outwards from center color swatch 502. They also extend "upwards," or to lighter color adjustments.

Secondary test chart 520 includes center color swatch 522. It also includes the first ring of color swatches 524, similar the first ring of color swatches 404 of first test chart 112. Secondary test chart 520 also includes the second ring of color swatches 526, the third ring of color swatches 528, the fourth ring of color swatches 530, and the fifth ring of color swatches 532. The distances between the rings of secondary test chart 522 increase as they extend outwards from center color swatch 522. They also extend "downwards," or to darker color adjustments.

To show this feature, distances, or amounts of adjustment L2 to L12 are shown. Amounts of adjustment L2 to L12 may represent the "distance" from the color swatches of secondary test chart 520 to their corresponding color swatches on first test chart 112. Secondary test chart 500 and first test chart 112 may include similar distances, or amounts of adjustment, but are not shown here for brevity. Amount of adjustment L2 may be between target color swatch 402 and center color swatch 522. This amount of adjustment is the smallest between target color swatch 402 and a color swatch on secondary test chart 520. It represents a darker variation of the spot color of target color swatch 402.

The distance, or amount of adjustment, between the first ring of color swatches 404 and the first ring of color swatches 524 is L4, which is greater than L2. The distance, or amount of adjustment, between the second ring of color swatches 406 and the second ring of color swatches 526 is L6, which is greater than L4. The distance, or amount of adjustment, between the third ring of color swatches 408 and the third ring of color swatches 528 is L8, which is greater than L6. The distance, or amount of adjustment, between the fourth ring of color swatches 410 and the fourth ring of color swatches 530 is L10, which is greater than L8. The distance, or amount of adjustment, between the fifth ring of color swatches 412 and the fifth ring of color swatches 532 is L12, which is greater than L10. A selection of a color swatch 532 will result in the largest adjustment from the spot color of target color swatch 402.

This feature allows the disclosed embodiments to "throw a net" on the space around target color swatch 402 and allow a non-flat selection using a three-dimensional mesh of color swatches. The secondary test charts present more information to the user when printed with the initial test chart. The color distances increase as the swatches move farther away from target color swatch 402. If a color swatch is selected on a secondary test chart as the target color for second test chart 116, then the lightness or saturation also is changed. Second test chart 116 would be angled between the selected color swatch and target color swatch 402.

For example, if a color swatch 528 of the third ring of secondary test chart 520 is selected, then the angle of the new chart within the color space will be along the hypotenuse of a triangle created by the sides of D2+D4+D6 for the horizontal direction and L8 for the vertical direction from target color swatch 402. This feature removes the need under conventional spot color adjustment to move in the horizontal direction using multiple iterations of test charts, then moving in the vertical direction to adjust lightness. Several iterations are eliminated according to the disclosed embodiments. The new space for the subsequent test chart moves orientation as well as distance.

In some embodiments, adjustments may be made that are intermediary to the primary (CMY) and secondary (RGB) colorants. In other words, there may be adjustments between the swatches in the additional color rings beyond color swatches 406. Further, there may be adjustments between swatches in a ring. Further, the lightness of the primary chart may be consistent. Alternatively, the lightness of the primary chart may vary such that the primary chart is angled so that both colors are in the primary chart. Basically, in some embodiments, the lightness is consistent even if the operator moves it up and down by selecting a color swatch from the secondary chart. In other embodiments, the lightness varies within the chart because it is tilted within the lightness plane to get both swatches in the secondary chart.

Figure 6:
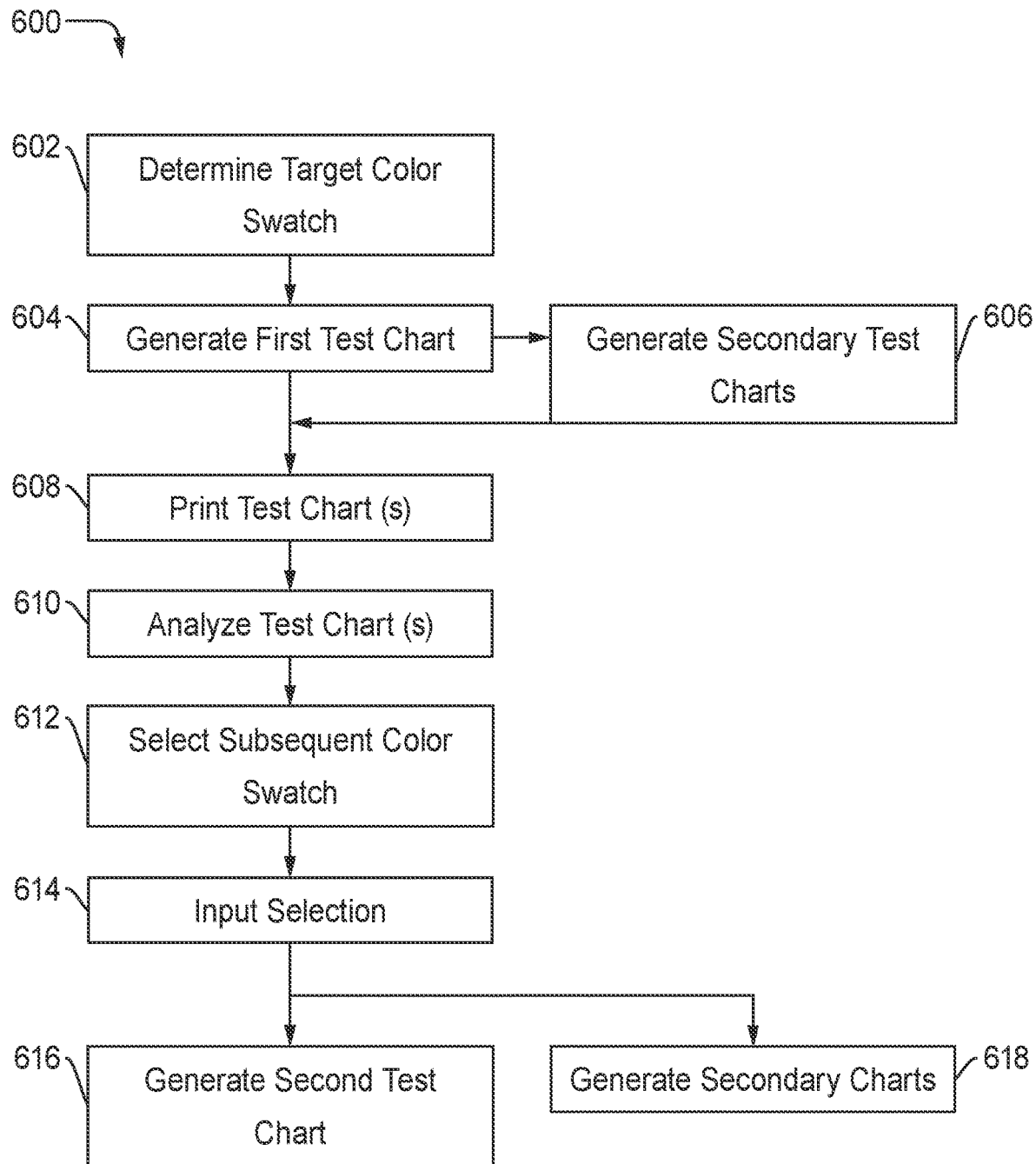
FIG. 6 illustrates a flowchart for implementing spot color adjustment operations according to the disclosed embodiments.

FIG. 6 depicts a flowchart 600 for implementing spot color adjustment operations according to the disclosed embodiments. Flowchart 600 may refer to FIGS. 1A to 5 for illustrative purposes. Flowchart 600, however, is not limited to the embodiments disclosed by FIGS. 1A to 5.

Step 602 executes by determining a spot color of interest for target color swatch 402. The operator may select a spot color using adjustment application 110 or adjustment device 108. This spot color is used for the basis of target color swatch 402. Step 604 executes by generating first test chart 112 using target color swatch 402. First test chart 112 includes a plurality of rings of color swatches. Each ring of color swatches is positioned of the plurality of rings around target color swatch 402 at an adjustment value. For example, the first ring of color swatches 404 are positioned at amount of adjustment D2. The second ring of color swatches 406 are positioned at amounts of adjustment D4 and D2. The third ring of color swatches 408 are positioned at amounts of adjustment D6, D4, and D2. The fourth ring of color swatches 410 are positioned at amounts of adjustment D8, D6, D4, and D2. The fifth ring of color swatches 412 are positioned at amounts of adjustment D10, D8, D6, D4, and D2.

The adjustment values, or amounts of adjustment, for each ring of color swatches corresponds to a color change from target color swatch 402. The number of color swatches in each ring increases as they extend away from target color swatch 402. As disclosed above, the adjustment value, or D2, for the first ring of color swatches 404 is less than the adjustment value for the second ring of color swatches 406, or D2 and D4.

Step 606 may execute by generating secondary test charts 500 and 520. Secondary test charts 500 and 520 differ from first test chart 112 as disclosed above. Any number of secondary test charts may be printed, with differences in the lightness or saturation from target color swatch 402. Step 608 executes by printing first test chart 112 and any applicable secondary test charts. The test charts may be printed at printing device 104. Color printing operations may be implemented in printing the test charts.

Step 610 executes by analyzing first test chart 112 and any applicable secondary test charts. The operator scans the printed test charts to find a second spot color to which to adjust the desired color. Step 612 executes by selecting a subsequent color swatch having the second spot color of interest. This selection will be used in generating subsequent test charts. Step 614 executes by inputting the selection to adjustment application 110 or adjustment device 108. The operator may input the selection at printing device 104 or adjustment device 108 using a display screen. Alternatively, printing device 104 may scan the appropriate test chart and determine which color swatch was selected.

Step 616 executes by generating second test chart 116. The selected color swatch of the second spot color is used as target color swatch 402 for the new test chart. The rings of color swatches are generated on the test chart based on the second spot color. The rings of color swatches may be based on the adjustment value, or amount of adjustment, between the initial target color swatch in first test chart 112 and the selected color swatch. As disclosed above, the disclosed embodiments dynamically determine the adjustment size for each iteration or distance between the target color swatch and the selected color swatch. As disclosed above, the target color swatch may be adjusted so that the ring of the selected color swatch covered a space that is based on this distance.

Alternatively, the previous target color swatch may be placed on the outermost, or fifth ring, of second test chart 116 and then the distances between the inner rings ($1^{st}$, $2^{nd}$, $3^{rd}$, and $4^{th}$) are adjusted proportionally to match this distance to the fifth ring of color swatches. If the adjustment between the initial target color swatch and the selected color swatch is small, then second test chart 116 will show finer granularity in the resulting adjustments for the second test chart. This feature may speed up the process of finding the right values for the desired spot color. Further, if the operator selects a color in the fifth ring of color swatches 412, the disclosed embodiments may move that ring to the $3^{rd}$ or $4^{th}$ ring so that second test chart 116 covers a larger area than the default test chart. The operator may select these options before generating second test chart 116.

With regard to selecting a color swatch from one of secondary test charts 500 and 520, the disclosed embodiments also may adjust the distances for the rings of second test chart 116 accordingly. If the operator selected a color swatch from one of the secondary test charts, then the disclosed embodiments generate second test chart 116 that has the selected color swatch at the center, or the target color swatch, at the same distance, or amount of adjustment, as the selected swatch is from the initial target color swatch. The initial target color swatch and the selected color swatch may swap places in second test chart 116. The rest of the color swatches in the rings fall in their respective positions. As disclosed above, the angle between the swatches may be used in generating the new color swatches for second test chart 116.

Step 618 executes by generating first secondary chart 118 and second secondary chart 120 based on second test chart. First secondary chart 118 may be similar to secondary test chart 500 and second secondary chart 120 may be similar to secondary test chart 520. Further, additional secondary test charts may be printed to allow for more options in reviewing colors having differences in hue, lightness, or saturation.

Figure 7:
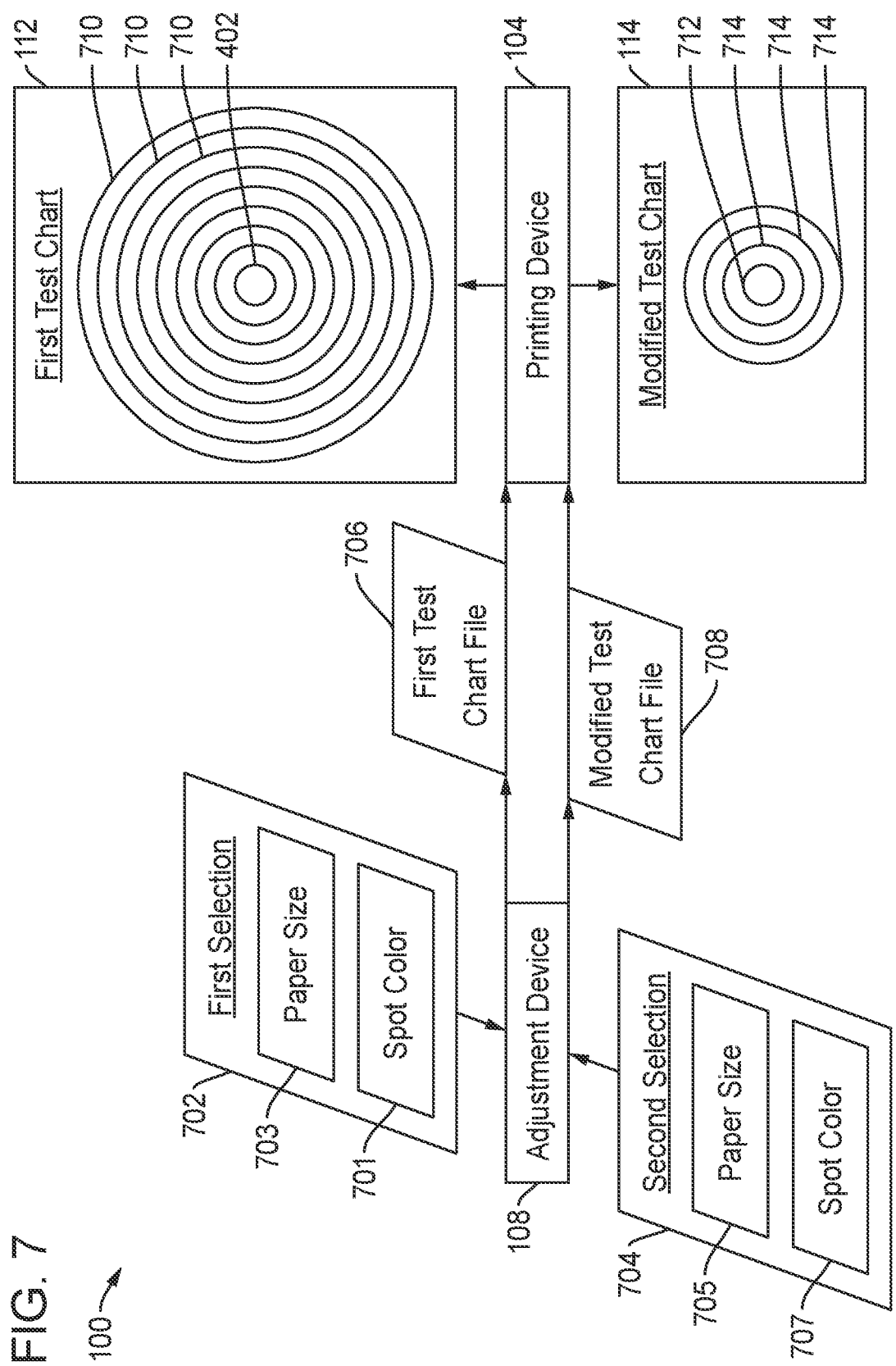
FIG. 7 illustrates a block diagram of the adjustment device for the printing system adjusting a number of rings based on paper size according to the disclosed embodiments.

FIG. 7 depicts a block diagram of adjustment device 108 for printing system 100 adjusting a number of rings based on paper size according to the disclosed embodiments. Printing system 100 may incorporate various chart composition enhancements. Some embodiments allow the operator to specify different paper sizes on which to print, for example, first test chart 112. Other paper sizes may be specified for second test chart 116, modified test chart 114, and the like. Adjustment device 108 may instruct printing device to print a certain number of rings based on the paper size for the test chart.

To print first test chart 112, the operator may provide a first selection 702 for a spot color 701 to adjustment device 108. Spot color 701 will be the basis for target color swatch 402 in first test chart 112. Along with spot color 701, first selection 702 also includes paper size 703 for first test chart 112. As opposed to embodiments where the paper size of the test charts is set, these embodiments allow the operator to specify a paper size in order to adjust the number of swatches printed. Adjustment device 108 may generate the test chart based on the size of the paper.

Adjustment device 108 generates first test chart file 706, which includes the electronic data to print first test chart 112 including the CMYK values for the swatches, as disclosed above. First test chart file 706 will include data to use a paper having paper size 703 for the test chart. Printing device 104 may print first test chart 112 based on first test chart file 706. Paper size 701 for first test chart may be A3, which is larger than letter or A4 size. In the embodiments disclosed by FIG. 4, target color swatch 402 is surrounded by rings 404, 406, 408, 410, and 412 of color swatches, wherein each ring of color swatches are positioned around target color swatch 402 at an adjustment value. The adjustment value for each ring of color swatches corresponds to a color change from target color swatch 402. The adjustment values between rings of color swatches increases as the rings move out from target color swatch 402.

As paper size 701 is larger than the normal size for printing test charts, first test chart 112 includes additional rings 710 of color swatches. In some embodiments, the number of rings 710 of color swatches is 3 to give a total of 8 rings of color swatches. This increased number of color swatches provides a broader range of colors to the operator to select a desired spot color. Further, intermediary swatches may be placed in the outer rings to shift lightness up and down from a bordering color swatch. This feature is disclosed in greater detail by FIG. 8.

The operator may select a color swatch of a desired spot color 707 from first test chart 112 to generate modified test chart 114 in order to perform further spot color selection. Thus, the operator creates second selection 704 to submit to adjustment device 108, as disclosed above. Second selection 704 includes desired spot color 707 along with paper size 705 for modified test chart 114. Adjustment device 108 generates modified test chart file 708 that includes the data to produce modified test chart 114 along with a specified paper size 705. Paper size 705 may differ from paper size 703. For example, paper size 705 may be A5 paper, which is smaller than the A3 paper size used for first test chart 112.

The operator may not desire a large number of color swatches for the second iteration of selecting a spot color. There is no need to have printing device 104 print a large number of swatches. This feature may save printing costs, ink, and the like. Thus, modified test chart 114 is printed by printing device 104 having only three rings 714 of color swatches around target color swatch 712. Target color swatch 712 may reflect selected spot color 707.

If no paper size is indicated in a selection received at adjustment device 108, then the disclosed embodiments may default to letter or A4 paper size with 5 rings of color swatches, as disclosed by FIG. 4. The disclosed embodiments, however, allow the operator to determine a number for the rings of color swatches around the target color swatch by adjusting the size of the paper used to print the test chart.

Figure 8:
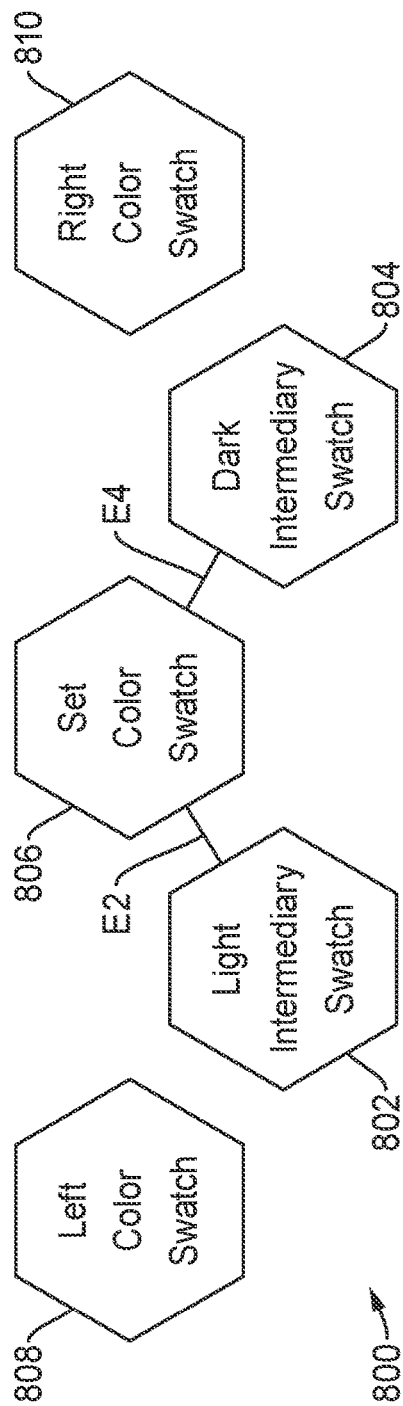
FIG. 8 illustrates a block diagram of intermediary color swatches with a set color swatch within the outer rings of the first test chart according to the disclosed embodiments.

FIG. 8 depicts a block diagram of intermediary color swatches 802 and 804 with a set color swatch 806 within an outer ring 800 of first test chart 112 according to the disclosed embodiments. Outer ring 800 may be one of outer rings 710 shown in FIG. 7. Outer ring 800 may include a greater number of color swatches that the inner rings, which may be the first to fifth rings around target color swatch 402. Due to the larger amount of room in the outer rings, these rings also may implement intermediary color swatches that adjust the lightness and darkness of one of the set colors in the ring.

Set color swatch 806 may represent a possible spot color generated by adjustment device 108 for use within first test chart 112. The generation of colors within the rings is disclosed above. If the operator desires the spot color corresponding to set color swatch 806, then the operator may select it as the spot color or to generate further test charts. Differences in the composition of colors based on lightness may be implemented using the embodiments disclosed above by FIG. 5. Some embodiments, however, may use intermediary color swatches instead of printing additional test charts.

Thus, the disclosed embodiment also may generate light intermediary color swatch 802 and dark intermediary color swatch 804. These swatches may be placed intermediate between outer ring 800 and another outer ring on first test chart 112. They also may be placed in space between color swatches in a ring. Here, set color swatch 806 may be bordered by left color swatch 808 and right color swatch 810. Light intermediary color swatch 802 may be placed between set color swatch 806 and left color swatch 808. Dark intermediary color swatch 804 may be placed between set color swatch 806 and right color swatch 810.

Left color swatch 808 and right color swatch 810 may include their own intermediary color swatches also printed on first test chart 112. In some embodiments, those intermediary color swatches will be based on the respective color swatch within outer ring 800 and not based on other intermediary color swatches.

The disclosed embodiment generate the colors for the intermediary color swatches according to an adjustment value for lightness. As with distances L2 disclosed above, the adjustment value for light intermediary color swatch 802 may be shown by positive distance E2 from the color of set color swatch 806 in the lightness direction of the color spectrum. The adjustment value for dark intermediary color swatch 804 may be shown by negative distance E4 from the color of set color swatch 806 in the lightness direction of the color spectrum. Thus, light intermediary color swatch 802 may be similar to the color swatches on secondary color chart 500. Dark intermediary color swatch 804 may be similar to the color swatches on secondary color chart 520. In some embodiments, distance E2 may be the same as distance E4, just in different directions in the color space.

Figure 9:
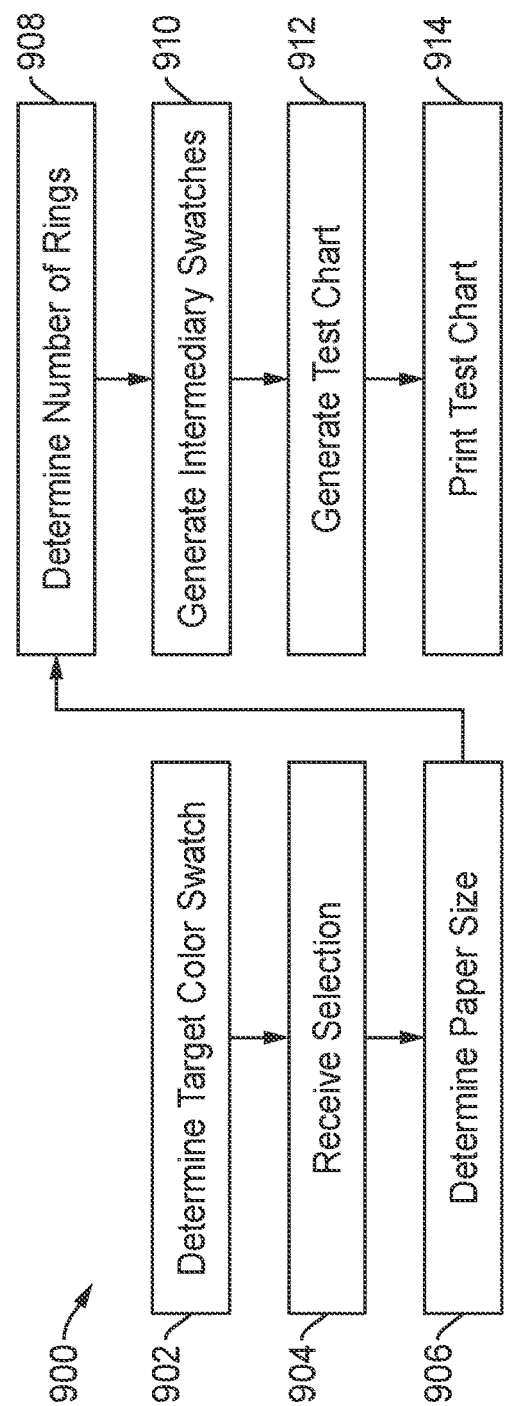
FIG. 9 illustrates a flowchart for implementing spot color adjustment operations by generating a test chart based on page size according to the disclosed embodiments.

FIG. 9 depicts a flowchart 900 for implementing spot color adjustment operations by generating a test chart based on page size according to the disclosed embodiments. Flowchart 900 may refer to FIGS. 1A-8 for illustrative purposes. Flowchart 900, however, is not limited to the embodiments disclosed by FIGS. 1A-8.

Step 902 executes by determining target color swatch 402 for a spot color. Step 902 may execute in a similar manner to step 602, disclosed above. Step 904 executes by receiving a selection for the spot color. The selection may be received by adjustment device 108. As shown in FIG. 7, first selection 702 may include paper size 703 and spot color 701. Step 906 executes by determining paper size 703 from first selection 702. The disclosed embodiments may default to letter or A4 paper size. The operator, however, may specify a different paper size for the test chart. For example, paper size 703 may specify A3 or A5 as the paper size.

Step 908 executes by determining the number of rings of color swatches to print on the test chart, such as first test chart 112. Referring back to FIG. 4, 5 rings of color swatches encircle target color swatch 402. This number may be the default number of rings. The disclosed embodiments, however, may vary the number of rings based on the paper size. Adjustment device 108 may determine that additional rings can be added to larger paper sizes and some rings may be deleted for smaller paper sizes. The disclosed embodiments may have default numbers of rings for specific sizes. For example, adjustment device 108 may determine 8 rings of color swatches can be included on A3 paper, 5 rings on A4 paper, and 3 rings on A5 paper. The disclosed embodiments generate the color swatches for these rings, as disclosed above.

Step 910 executes by generating intermediary swatches for differences in lightness and darkness with the color space for swatches within the outermost rings. This step may be optional. Adjustment device 108 may determine that additional space exists on the test chart to include intermediary swatches, such as light intermediary color swatch 802 and dark intermediary color swatch 804, disclosed above. Space between the outermost rings may be analyzed to determine if the intermediary swatches will fit. If so, then adjustment device 108 may generate intermediary swatches along with the color swatches for the rings.

Step 912 executes by generating the test chart based on the generated data for the color swatches, such as first test chart 112. Step 912 may execute in a similar manner to step 604 disclosed above. Step 914 executes by printing the test chart, such as first test chart 112, with target color swatch 402, the rings of color swatches based on the size of the paper for the test chart, and, if applicable, the intermediary color swatches. Step 914 may execute in a similar manner to step 608 disclosed above.

Figure 10:
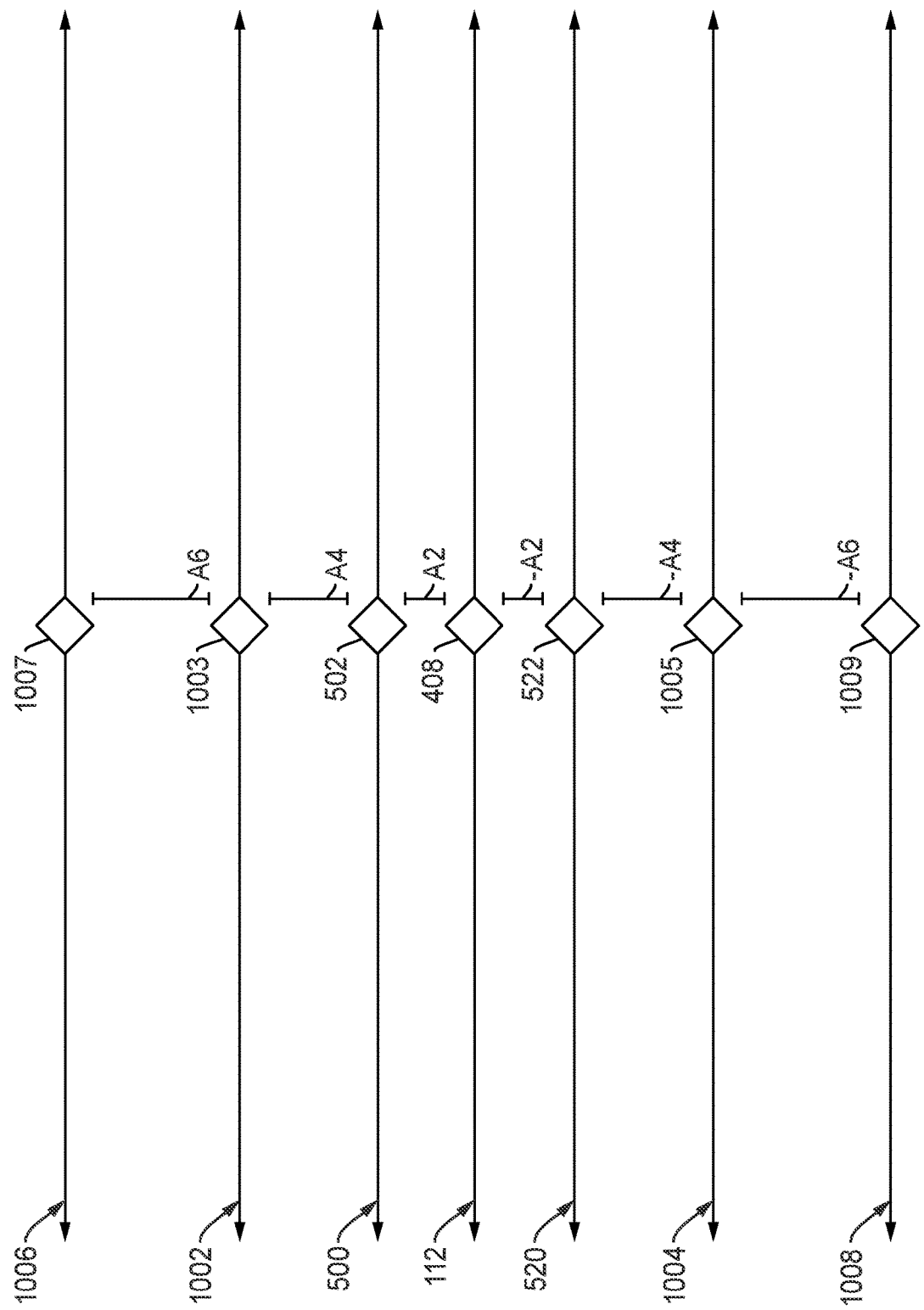
FIG. 10 illustrates the first test chart with multiple secondary charts having adjustments according to lightness according to the disclosed embodiments.

FIG. 10 depicts first test chart 112 with secondary charts 500, 520, 1002, 1004, 1006, and 1008 having adjustments according to lightness according to the disclosed embodiments. FIG. 10 may include the features and embodiments disclosed by FIG. 5 above, except that an increased number of secondary charts are generated based on the spot color of target color swatch 402.

First test chart 112, secondary chart 500, and secondary chart 520 are generated as disclosed above by FIG. 5. Not all the rings of color swatches are shown with the charts for brevity. Each chart may include a plurality of rings of color swatches encircling a center swatch based on test color swatch 402. As disclosed above, center color swatch 502 of secondary chart 500 may differ from test color swatch 402 by a lightness adjustment A2. The lightness adjustment may correspond to distance L2 in FIG. 5. Lightness adjustment A2 may represent the lightness change between test color swatch 402 and center color swatch 502. Center color swatch 502 should be lighter in appearance than test color swatch 402. Once center color swatch 502 is determined, then the plurality of rings of color swatches may be generated for secondary chart 500.

Secondary chart 520 is created in much the same way as secondary chart 500, except the center color swatch 522 will be darker than test color swatch 402. Thus, lightness adjustment −A2 is the negative value of lightness adjustment A2 for secondary chart 500. Lightness adjustment −A2 also may correspond to distance L2 in FIG. 5, but in the opposite direction in the color space as the distance between center color swatch 502 and target color swatch 402. For example, a lightness adjustment value for A2 may be +4 while the lightness adjustment value for −A2 may be −4.

The disclosed embodiments also may generate and print additional secondary charts based on target color swatch 402. The disclosed embodiments may vary the lightness adjustments between the additional charts so that the charts closest to first test chart 112 have a smaller lightness change versus the outer charts. Thus, adjustment device 108 may generate secondary charts 1002 and 1004. Secondary chart 1002 may include center color swatch 1003, which is generated based on a color for center color swatch 502. A lightness adjustment A4 may be used to adjust the lightness from center color swatch 502 to center color swatch 1003. The lightness adjustment value for lightness adjustment A4 is greater than the lightness adjustment value for lightness adjustment A2.

Secondary chart 1004 may include center color swatch 1005, which is generated based on the color for center color swatch 522. Secondary color chart 1004 may be in the opposite direction within the color space from secondary color chart 1002. Center color swatch 1005 will have a lightness adjustment −A4, which corresponds to lightness adjustment A4 for center color swatch 1003. The lightness adjustment value for lightness adjustment −A4 is greater in the negative direction that the lightness adjustment value for lightness adjustment −A2.

This feature may be applied to the generation of secondary chart 1006. Secondary chart 1006 may include center color swatch 1007, which has a lightness adjustment A6 from center color swatch 1003 of secondary chart 1002. Secondary chart 1008 may include center color swatch 1009, which has a lightness adjustment −A6 from center color swatch 1005 of secondary chart 1004. The lightness adjustment value for lightness adjustment A6 is greater than the lightness adjustment value for lightness adjustment A4. The lightness adjustment value for lightness adjustment −A6 is greater in the negative direction than the lightness adjustment value for lightness adjustment −A4. Thus, as secondary charts will increase in lightness or darkness adjustment the farther away they are from first test chart 112.

For example, target color swatch 402 has no adjustment value. Center color swatch 502 of secondary chart 500 may have a lightness adjustment value of +4 for lightness adjustment A2. The disclosed embodiments may generate a plurality of rings of color swatches centered on center color swatch 502 as disclosed above. Center color swatch 522 of secondary chart 520 may have a lightness value of −4 for lightness adjustment −A2. The disclosed embodiments may generate a plurality of rings of color swatches centered on center color swatch 522.

The operator may request a total of 7 charts, which includes first test chart 112 and 6 secondary charts. Thus, secondary chart 1002 is generated with center color swatch 1003. Center color swatch 1003 may have a lightness adjustment value of +7 for lightness adjustment A4. This adjustment value is greater than the +4 value for lightness adjustment A2. Combined with the +4 value for lightness adjustment A2, secondary chart 1002 may have a total lightness adjustment value of +11 from target color swatch 402. Secondary chart 1004 is generated with center color swatch 1005. Center color swatch 1005 may have a lightness adjustment value of −7 for lightness adjustment −A4. This adjustment value is greater than the −4 value for lightness adjustment −A2. Combined with the −4 value for lightness adjustment −A2, secondary chart 1004 may have a total lightness adjustment value of −11 from target color swatch 402.

The increasing adjustment value feature may continue for secondary charts 1006 and 1008. Secondary chart 1006 is generated with center color swatch 1007. Center color swatch 1007 may have a lightness adjustment value of +10 for lightness adjustment A6. This adjustment value is greater than the +7 value for lightness adjustment A4. Combined with the +4 and +7 values for lightness adjustments A2 and A4, respectively, secondary chart 1006 may have a total lightness adjustment value of +21 from target color swatch 402. Secondary chart 1008 is generated with center color swatch 1009. Center color swatch 1009 may have a lightness adjustment value of −10 for lightness adjustment −A6. This adjustment value is greater than the −7 value for lightness adjustment −A4. Combined with the −4 and −7 values for lightness adjustments −A2 and −A4, respectively, secondary chart 1008 may have a total lightness adjust value of −21 from target color swatch 402.

As can be seen, the outer secondary charts have a greater amount of lightness adjustment values. This feature may provide a greater spectrum of available color swatches for spot color adjustment. In some embodiments, the adjustment lightness value may be the same between center color swatches of the secondary charts.

Figure 11:
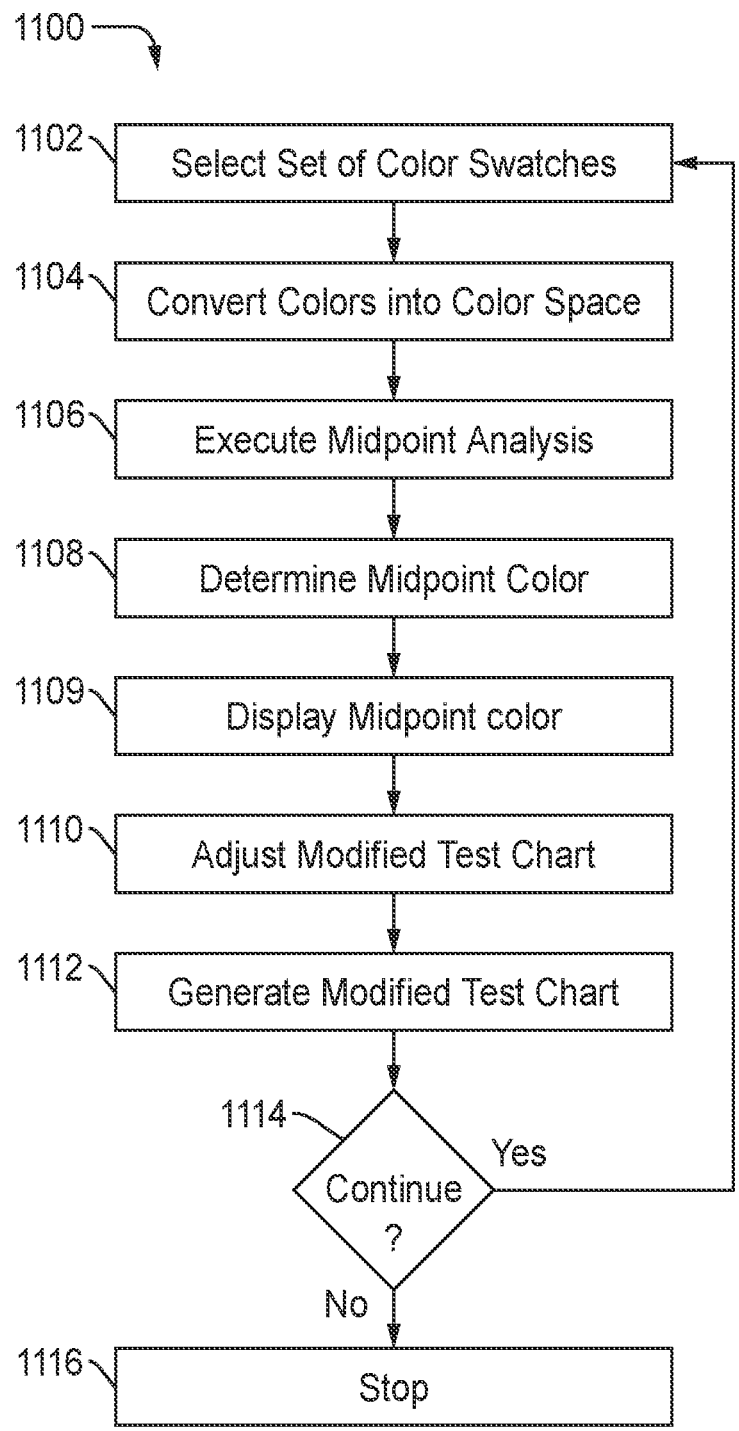
FIG. 11 illustrates a flowchart for adjusting a spot color using multiple color swatches according to the disclosed embodiments.

FIG. 11 depicts a flowchart 1100 for adjusting a spot color using multiple color swatches according to the disclosed embodiments. Flowchart 1100 may refer to FIGS. 1A-10 for illustrative purposes. Flowchart 1100, however, is not limited to the embodiments disclosed by FIGS. 1A-10.

Flowchart 1100 allows the operator to enter multiple color swatches, or swatch numbers, to determine a midpoint color to use as the center color swatch of modified test chart 114. The disclosed embodiments may use the midpoint color as the center, or target, color swatch for a subsequent test chart. This feature reduces the number of iterations needed to select desired colors.

Step 1102 executes by selecting a set of color swatches from one or more charts, such as first test chart 112 or secondary charts as disclosed above. Any number of color swatches may be selected. Preferably, at least three color swatches are selected by the operator. Step 1104 executes by converting the colors corresponding to the selected color swatches into the L*a*b color space. In other words, each color will represent a point in the 3D color space. Alternatively, the colors may be converted into a CMYK color space. The disclosed embodiments, however, will discuss a 3D space below. L may represent lightness, a may represent the red/green coordinate, and b may represent the yellow/blue coordinate. Each color will have a coordinate value, such as $L_1$, $a_1$, and $b_1$ (similar to $x_1$, $y_1$ and $z_1$ for a 3D coordinate), within the 3D color space.

Step 1106 executes by executing a midpoint analysis using the coordinates for the selected colors. The disclosed embodiments may include several methods to determine a midpoint within the 3D color space. For example, a preferred operation may include the following equation for three selected color points:

$$\text{Midpoint color} = ((L_1+L_2+L_3)/3, (a_1+a_2+a_3)/3, (b_1+b_2+b_3)/3))$$

This equation will work with any number of points, not just three. For example, for 5 colors, all 5 points in the L, a, and b coordinates will be summed and divided by 5.

Step 1108 executes by determining a midpoint color using the results of the midpoint analysis. The equation used above should yield a result having values for L, a, and b for a color in the L*a*b color space. This color will be the midpoint color. The midpoint color may not necessarily match a color swatch on the printed test charts. Step 1109 executes by displaying the midpoint color to the operator. Alternatively, the midpoint color may be printed on a paper of choice so that the operator can visually check the effectiveness of the midpoint color. At this stage, the operator may stop spot color adjustment operations if the midpoint color is the desired spot color.

Step 1110 executes by adjusting modified test chart 114, as disclosed above, but with the midpoint color as opposed to a selected color swatch. The midpoint color will be converted into a color swatch. The midpoint color may become the center color swatch for the modified test chart. Step 1112 executes by generating modified test chart 114 as disclosed above, but with the midpoint color as the center color swatch. The disclosed embodiments will generate the plurality of rings of color swatches centered around the midpoint color.

Step 1114 executes by determining whether spot color adjustment operations should continue. If yes, then flowchart 1100 returns to step 1102 to receive a new set of selected color swatches from modified test chart 114 and any secondary charts made available to the operator. Flowchart 1100 may be executed again to determine a new midpoint color based on the second set of selected color swatches. If step 1114 is no, then step 1116 executes by stopping the operations for flowchart 1100. This series of decision steps may occur before step 1110 to avoid generating additional test charts if the midpoint color is the desired spot color.

Figure 12:
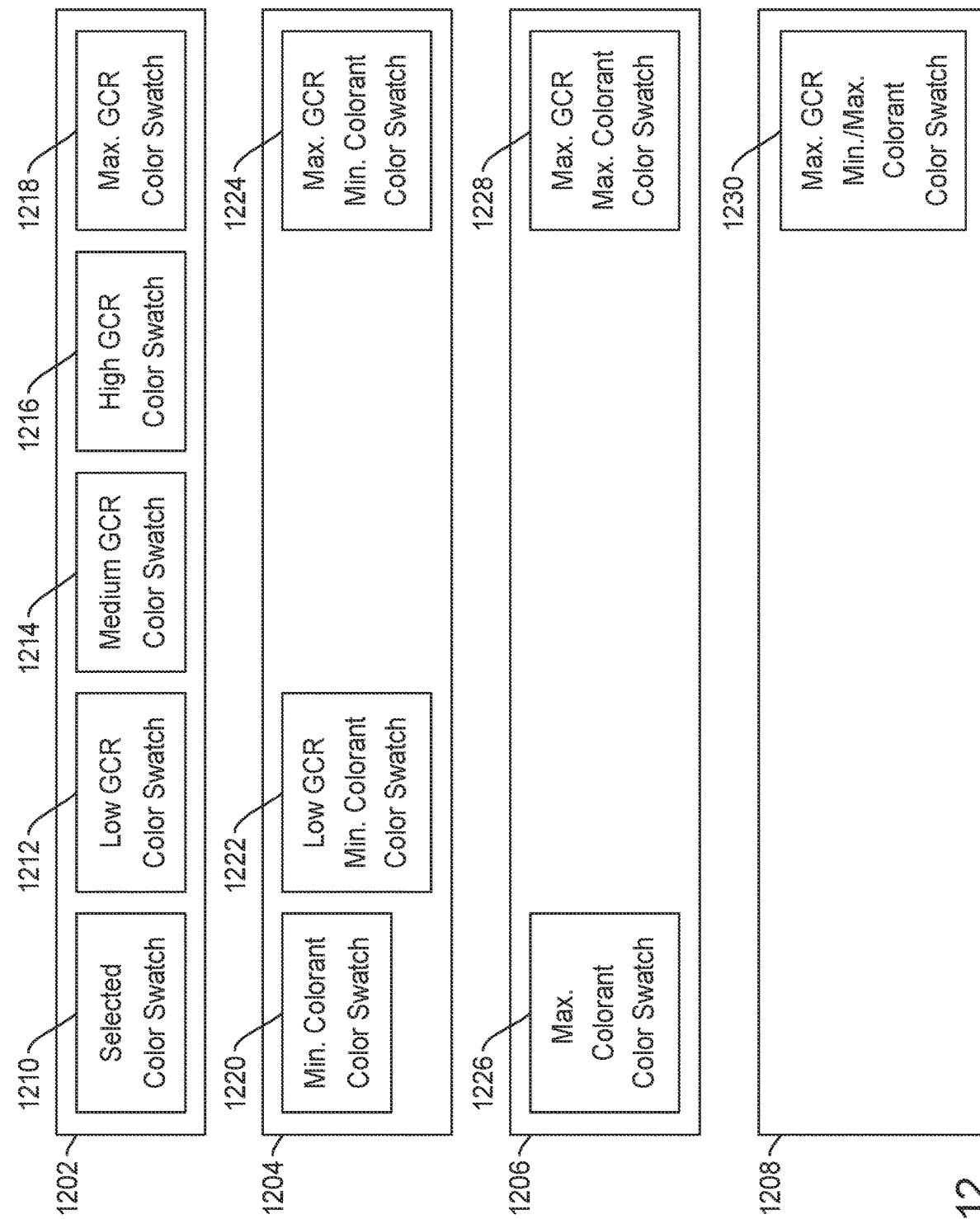
FIG. 12 illustrates a block diagram of a color swatch chart having color swatches generated using swatch composition adjustments according to the disclosed embodiments.

FIG. 12 depicts a block diagram of a color swatch chart 1200 having color swatches generated using swatch composition adjustments according to the disclosed embodiments. In spot color adjustment operations, once the operator selects a color swatch, or determines a midpoint color as disclosed in FIG. 11, the printing system may provide the operator the option to change swatch composition in order to improve reproducibility. For example, printed colors are more stable if they use fewer colorants, or if they use less CMY ink. Gray component replacement (GCR) may achieve this.

GCR may be defined as the process of replacing the achromatic component of mixture of chromatic (CMY) inks by a corresponding amount of the achromatic (K, or black) ink. GCR may be desired for several reasons. Black ink usually is less expensive than colored inks. Using less amounts of colored inks makes the printing process more stable because there is a lower level of colorants, which minimizes their effects if they vary slightly. Too much ink may cause problems in production printing devices. Black ink reduces the overall ink coverage. The addition of black ink extends the density of any shadows.

GCR operations may include low, medium, heavy, and maximum GCR levels. The different levels may influence how the color looks on a printed medium. It also determines how much black ink to use in place of CMY inks. GCR may include the removal of the gray components of the three colors along with the replacement of these colors with black ink. In GCR replacement operations, all the primary and secondary colors remain the same as the normal chromatic reproduction. The blackening effects, however, by the tertiary colors along with the gray components of the other two colors may be removed and replaced with black. Various percentages of GCR may be applied for economical reasons and visually more pleasing results. For example, the black dot sizes may be increased to replace the gray component that has been reduced in the process colors.

Thus, a low GCR level may include a 25% gray component replacement. A medium GCR level may include a 50% gray component replacement. A high GCR level may include a 75% gray component replacement. A maximum GCR level may include a 100% gray component replacement.

The disclosed embodiments, therefore, may generate a separate color swatch chart 1200 having a plurality of color swatches based on a selected color swatch 1210. As disclosed above, selected color swatch 1210 may be selected from first test chart 112 or one of the secondary charts, or even modified test chart 114. In some embodiments, selected color swatch 1210 also may represent a midpoint color as determined using the embodiments disclosed by flowchart 1100. Selected color swatch 1210 may represent the selected spot color without any GCR, or a GCR level of 0%.

Color swatch chart 1200 may be broken down into rows. Row 1202 may be the primary row of color swatches. It includes selected color swatch 1210 and the color swatches for the different levels of GCR. Low GCR color swatch 1212 may be the selected color with 25% GCR. Medium GCR color swatch 1214 may be the selected color with 50% GCR. High GCR color swatch 1216 may be the selected color with 75% GCR. Maximum GCR color swatch 1218 may be the selected color with 100% GCR. For every color swatch chart 1200, the color swatches of row 1202 may be included.

Other rows also may be included, depending on colorant levels. In addition to the color swatches of row 1202, the disclosed embodiments may include two settings for swatch composition. A minimum colorant setting may be 5% of the colorant. A maximum colorant setting may be 95% of the colorant. In addition to generating the color swatches for different GCR levels in row 1202, the disclosed embodiments may look at the CMYK values for all of the colors.

If selected color swatch 1210, low GCR color swatch 1212, medium GCR color swatch 1214, high GCR color swatch 1216, or maximum GCR color swatch 1218 includes a colorant that is below or above one of the above thresholds, then color swatch chart 1200 will show additional variations on that swatch. For color swatches in row 1202 that have colorants below the minimum colorant threshold, color swatch chart 1200 will include a color swatch variation in which that colorant is set to 0%. For color swatches in row 1202 that have colorants above the maximum colorant threshold, color swatch chart 1200 will include a color swatch variation in which that colorant is set to 100%. These variations may be shown in addition to the original swatches of row 1202.

For example, row 1204 may include color swatches that include a situation where a colorant is set to 0% as the colorant is below, for example, a minimum colorant setting of 5%. As shown, row 1204 includes a minimum colorant color swatch 1220, a low GCR minimum colorant color swatch 1222, and a maximum GCR minimum colorant color swatch 1224. Row 1206 may include color swatches that include a situation where a colorant is set to 100% as the colorant is above, for example, a maximum colorant setting of 95%. As shown, row 1206 includes a maximum colorant color swatch 1226 and a maximum GCR maximum colorant color swatch 1228. Row 1208 may include color swatches that include a situation where a first colorant is set to 0% as the first colorant is below the minimum colorant setting and a second colorant is set to 100% as the second colorant is above the maximum colorant setting.

Referring to FIG. 12, row 1204 shows minimum color swatches for colors that are less than 5% for C, M, Y, or K, and which have been changed to 0%. Row 1204 includes minimum colorant color swatch 1220 as the selected color of selected color swatch 1210 has a colorant with less than 5%. Low GCR minimum colorant color swatch 1222 also may be included as the colorant will be set to 0% as the amount of the colorant is reduced using GCR. As GCR is applied, the colorant may still be set to 0%, which is why there are no color swatches for minimum colorants for medium GCR color swatch 1214 and high GCR color swatch 1216. As GCR is applied more aggressively, other colorants are reduced so that a different, or second, colorants is now below 5%, which is why maximum GCR minimum colorant color swatch 1224 is included.

Row 1206 shows maximum color swatches for colors that are more than 95% for C, M. Y, or K, and which have been changed to 100%. As GCR is applied, the colorant may be lowered to less than 95% so that no variation color swatches are shown for low GCR color swatch 1212, medium GCR color swatch 1214, and high GCR color swatch 1216. As GCR is applied more aggressively, the K, or black, colorant is increased until it is above the 95% maximum colorant threshold, so that maximum GCR maximum colorant color swatch is included in row 1206.

Row 1208 shows maximum and minimum color swatches for colors that have a first colorant below the minimum colorant threshold of 5% and a second colorant above the maximum colorant threshold of 95%. This may occur when one colorant is reduced by the maximum GCR to below 5% and the K colorant is increased to above 95%. Maximum GCR minimum/maximum colorant color swatch 1230 is generated and placed in row 1208 with the first colorant set to 0% and the second colorant set to 100%. Maximum GCR minimum/maximum colorant color swatch 1230 may differ from maximum GCR minimum colorant color swatch 1224 and maximum GCR maximum colorant color swatch 1228.

In some embodiments, color swatch chart 1200 may be printed separately from a test chart or the secondary charts. In other embodiments, color swatch chart 1200 may be included on the test chart printed for the selected color of selected color swatch 1210 in an area apart from the plurality of rings of color swatches. This way, the operator may view the color swatches of color swatch chart 1200 along with the color swatches in the test chart. Further, the disclosed embodiments may adjust the paper size, as disclosed above, to include color swatch chart 1200.

Figure 13:
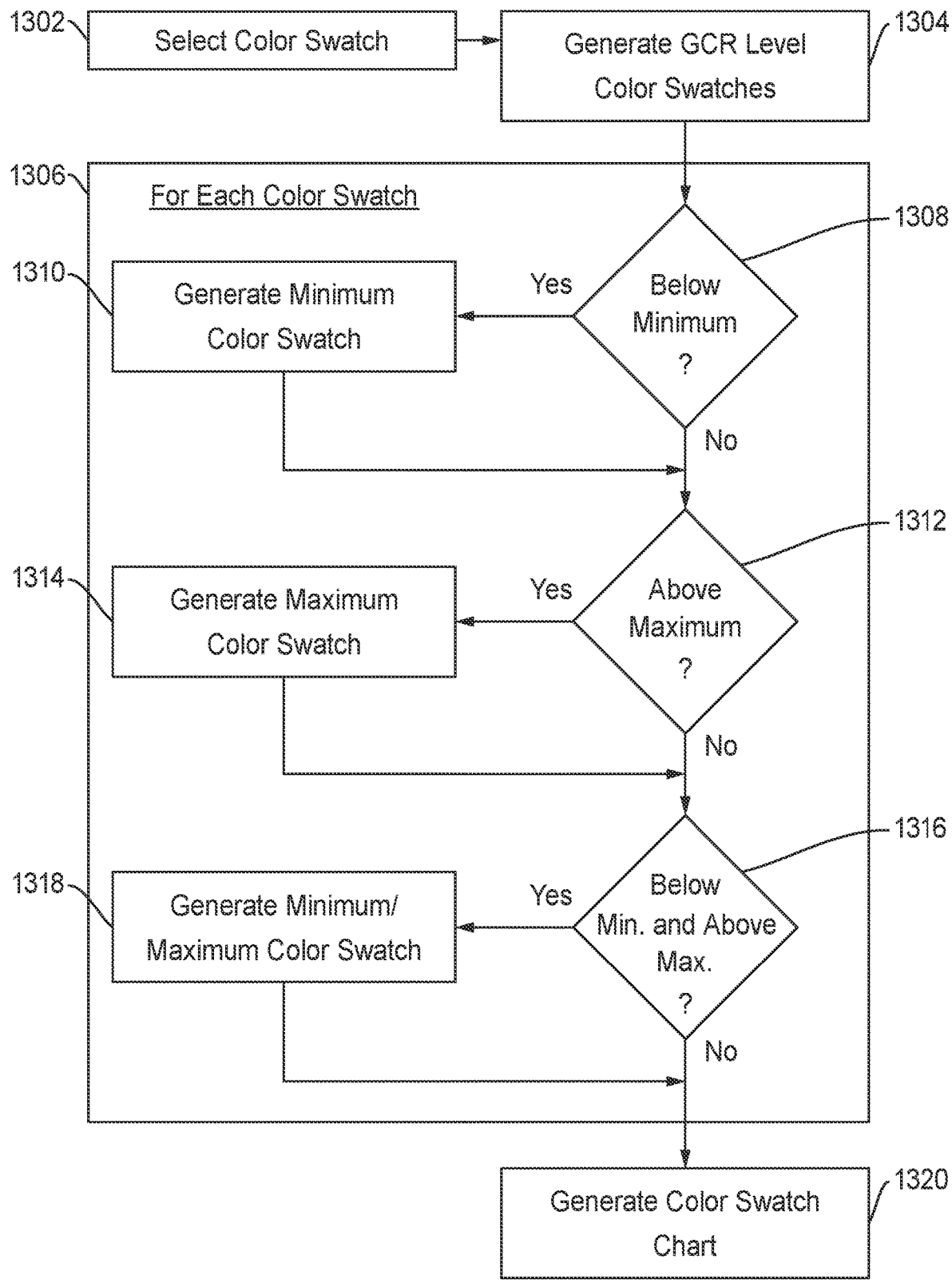
FIG. 13 illustrates a flowchart for performing swatch composition adjustments using GCR according to the disclosed embodiments.

FIG. 13 depicts a flowchart 1300 for performing swatch composition adjustments using GCR according to the disclosed embodiments. Flowchart 1300 may refer to FIGS.

1A-12 for illustrative purposes. Flowchart 1300, however, is not limited to the embodiments disclosed by FIGS. 1A-12.

Step 1302 executes by selecting a color swatch from first test chart 112, modified test chart 114, or a secondary chart. Alternatively, a midpoint color may be determined using flowchart 1100, disclosed above. Step 1304 executes by generating the GCR level color swatches based on the selected color swatch. Referring to FIG. 12, selected color swatch 1210 may be used to generate low GCR color swatch 1212, medium GCR color swatch 1214, high GCR color swatch 1216, and maximum GCR color swatch 1218. These color swatches represent the different levels of GCR as applied to the color of selected color swatch 1212. Selected color swatch 1210 may have a GCR level of 0%.

Set of steps 1306 may be executed for each color swatch generated above. In other words, the steps in set of steps 1306 is executed for selected color swatch 1210 as well as the color swatches for the different levels of GCR. Preferably, set of steps 1306 may be executed for 5 color swatches. Step 1308 executes by determining whether a colorant within the color for the respective color swatch is below the minimum colorant setting, such as 5%. Step 1308 may also determine if a colorant is above 0%. If yes, then step 1310 executes by setting the colorant to 0% and generating a minimum color swatch for this level of GCR. If step 1308 is no, or if the colorant is already set to 0%, then flowchart 1300 proceeds to step 1312.

Step 1312 executes by determining whether a colorant within the color for the respective color swatch is above a maximum colorant setting, such as 95%. Step 1312 also may determine if a colorant is below 100%. If yes, then step 1314 executes by setting the colorant to 100% and generating a maximum color swatch for this level of GCR. If step 1312 is no, or if the colorant is already set to 100%, then flowchart proceeds to step 1316.

Step 1316 executes by determining whether a first colorant is below the minimum colorant setting and a second colorant is above the maximum colorant setting. Step 1316 also may determine if the first colorant is above 0% and the second colorant is below 100%. If yes, then step 1318 executes by setting the first colorant to 0% and the second colorant to 100% and generating a minimum/maximum color swatch for this level of GCR.

Once all the color swatches have been analyzed, step 1320 executes by generating color swatch chart 1200, as disclosed above. Color swatch chart 1200 will include the color swatches generated in step 1302 and 1304 as well as those generated in steps 1310, 1314, and 1318. Not every level of GCR may include a minimum color swatch, a maximum color swatch, or a minimum/maximum color swatch. This feature prevents unnecessary use of resources or ink.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for printing a test chart for adjusting spot colors in printing operations, the method comprising:
   determining a first color swatch of a first spot color;
   specifying a size for a sheet for the test chart;
   determining a number for a plurality of rings of color swatches for the test chart centered around the first color swatch based on the size of the sheet;
   generating the test chart having the number of the plurality of rings by
      positioning each ring of color swatches of the plurality of rings around the first color swatch at an adjustment value,
      wherein the adjustment value for each ring of color swatches corresponds to a color change from the first color swatch,
      wherein the adjustment value for a first ring of color swatches of the plurality of color swatches is less than the adjustment value for a second ring of color swatches;
   printing the test chart having the number of the plurality of rings within the size for the sheet.

2. The method of claim 1, further comprising a set of outer rings of the plurality of rings furthest from the first color swatch.

3. The method of claim 2, wherein each of the rings of the set of outer rings includes at least one intermediary swatch.

4. The method of claim 3, wherein the at least one intermediary swatch includes a lightness adjustment value from a bordering color swatch.

5. The method of claim 1, further comprising selecting a second color swatch having a second spot color from one of the plurality of rings encompassing the first color swatch.

6. The method of claim 5, further comprising generating a new test chart having a revised number of a new plurality of rings of color swatches centered around the second color swatch, wherein the revised number of the new plurality of rings is based on a new size of a new sheet for the new test chart.

7. A method for adjusting spot colors in printing operations, the method comprising:
   determining a first color swatch of a first spot color as a center color swatch;
   generating a first plurality of test charts, each test chart having a plurality of rings of color swatches by
      positioning a first plurality of rings of color swatches for a first test chart centered around the first color swatch at a color adjustment value, wherein the adjustment value for each of the first plurality of rings corresponds to a first color change from the first color swatch,
      positioning a second plurality of rings of color swatches for a second test chart centered around a second color swatch at the color adjustment value, wherein the second color swatch differs from the first color swatch according to an increase in a lightness adjustment value, and
      positioning a third plurality of rings of color swatches for a third test chart centered around a third color swatch at the color adjustment value, wherein the third color swatch differs from the first color swatch according to a decrease in the lightness adjustment value; and
   selecting a desired color swatch having a desired spot color from one of the first plurality of rings, the second plurality of rings, and the third plurality of rings.

8. The method of claim 7, further comprising adjusting a second plurality of test charts using the desired color swatch of the desired spot color as the center color swatch.

9. The method of claim 8, further comprising generating the second plurality of test charts, each test chart having a plurality of rings of color swatches.

10. The method of claim 7, wherein generating the first plurality of test charts includes positioning a fourth plurality of rings of color swatches for a fourth test chart centered around a fourth color swatch at the color adjustment value.

11. The method of claim 10, wherein the fourth color swatch differs from the second color swatch according a greater increase in the lightness adjustment value.

12. The method of claim 10, wherein the fourth color swatch differs from the third color swatch according a greater decrease in the lightness adjustment value.

13. A method for adjusting spot colors in printing operations, the method comprising:
- determining a first color swatch of a first spot color;
- generating a test chart having a plurality of rings of color swatches by
  - positioning each ring of color swatches from the plurality of rings around the first color swatch at an adjustment value,
  - wherein the adjustment value for each ring of color swatches corresponds to a color change from the first color swatch,
  - wherein a number of color swatches in each ring increases extending away from the first color swatch, and
  - wherein the adjustment value for a first ring of color swatches is less than the adjustment value for a second ring of color swatches;
- selecting a set of color swatches from the plurality for rings, wherein the set of color swatches have different spot colors from the first spot color;
- determining a first midpoint color in a color space based on the set of color swatches;
- adjusting a first new test chart to center the first midpoint color; and
- generating the first new test chart having a new plurality of rings around the first midpoint color.

14. The method of claim 13, further comprising printing at least two secondary test charts, wherein each of the at least two secondary test charts include a center color swatch that differs in lightness or saturation from the first color swatch.

15. The method of claim 14, further comprising selecting a further set of color swatches from the at least two secondary test charts.

16. The method of claim 15, further comprising determining a second midpoint color in a color space based on the further set of color swatches.

17. The method of claim 16, further comprising adjusting a second new test chart to center the second midpoint color.

18. The method of claim 17, further comprising generating a second new test chart having another new plurality of rings around the second midpoint color.

19. The method of claim 17, wherein the set of color swatches includes at least three color swatches from the plurality of rings.

20. The method of claim 17, further comprising executing a midpoint analysis using each color of the set of color swatches.

* * * * *